(12) United States Patent
Kanamoto et al.

(10) Patent No.: US 8,836,812 B2
(45) Date of Patent: Sep. 16, 2014

(54) IMAGE PROCESSING DEVICE, IMAGE PROCESSING METHOD, AND IMAGE PROCESSING PROGRAM

(71) Applicant: Honda Elesys Co., Ltd., Yokohama (JP)

(72) Inventors: Junji Kanamoto, Yokohama (JP); Tomokazu Mitsui, Yokohama (JP)

(73) Assignee: Honda Elesys Co., Ltd., Yokohama (JP)

( * ) Notice: Subject to any disclaimer, the term of this patent is extended or adjusted under 35 U.S.C. 154(b) by 0 days.

(21) Appl. No.: 13/829,149

(22) Filed: Mar. 14, 2013

(65) Prior Publication Data

US 2013/0300897 A1 Nov. 14, 2013

(30) Foreign Application Priority Data

Mar. 21, 2012 (JP) ................. 2012-063739

(51) Int. Cl.
*H04N 5/235* (2006.01)
*H04N 5/225* (2006.01)
*H04N 5/76* (2006.01)
*G06K 9/00* (2006.01)
*G06K 9/34* (2006.01)
*G06K 9/36* (2006.01)
*H04N 5/232* (2006.01)

(52) U.S. Cl.
CPC ........ *H04N 5/23229* (2013.01); *B60R 2300/00* (2013.01); *G06K 9/00791* (2013.01); *B60R 2300/8093* (2013.01)
USPC ................. 348/222.1; 348/218.1; 348/231.99; 382/105; 382/173; 382/276

(58) Field of Classification Search
CPC .................. G06T 3/4038; G06T 15/20; G06T 2207/10016; G06T 2207/20021; H04N 5/23238; H04N 5/232; H04N 2101/00; G06K 9/00791; G06K 9/00134; G06K 9/00805; G06K 2009/2045; B60R 21/34; B60R 1/00
USPC .............................. 348/222.1, 218.1, 231.99; 382/103–105, 173, 276–308
See application file for complete search history.

(56) References Cited

U.S. PATENT DOCUMENTS 7,684,593 B2 * 3/2010 Chinomi ....................... 382/104
7,983,446 B2 * 7/2011 Wiedemann et al. ......... 382/103

(Continued)

FOREIGN PATENT DOCUMENTS

JP 2009-87253 A 4/2009

OTHER PUBLICATIONS

Viola et al., "Rapid Object Detection using a Boosted Cascade of Simple Features," Accepted Conference on Computer Vision and Pattern Recognition, 2001, 9 pages.

*Primary Examiner* — Chia-Wei A Chen
(74) *Attorney, Agent, or Firm* — Arent Fox LLP

(57) ABSTRACT

An image processing device includes an image acquiring unit, a storage unit, and an image processing unit, wherein the image region is divided into a plurality of sub-regions in the vertical direction, and wherein when the rectangular range set in the image region extends over two or more sub-regions, the image processing unit acquires the cumulative value at a pixel position in the lowermost sub-region of the two or more sub-regions by adding the cumulative values in the upper sub-regions at the pixel position in the same column of a lowermost row in the upper sub-regions, over which the rectangular range extends, to the cumulative value in the lowermost sub-region at the pixel position in the lowermost sub-region.

14 Claims, 20 Drawing Sheets

(56) References Cited

U.S. PATENT DOCUMENTS

| | | | |
|---|---|---|---|
| 8,036,427 B2* | 10/2011 | Nakamori et al. | 382/104 |
| 8,587,636 B2* | 11/2013 | Kimura | 348/36 |
| 8,594,370 B2* | 11/2013 | Schamp et al. | 382/103 |
| 2002/0191866 A1* | 12/2002 | Tanabe | 382/298 |
| 2004/0096121 A1* | 5/2004 | Kanatsu et al. | 382/290 |
| 2004/0257623 A1* | 12/2004 | Suzuki | 358/3.03 |
| 2009/0180711 A1* | 7/2009 | Lavin et al. | 382/283 |
| 2009/0256927 A1* | 10/2009 | Komiya et al. | 348/222.1 |
| 2010/0045815 A1* | 2/2010 | Tsuchiya | 348/222.1 |
| 2010/0149358 A1* | 6/2010 | Shioya et al. | 348/218.1 |
| 2010/0149368 A1* | 6/2010 | Yamashita et al. | 348/222.1 |
| 2011/0058741 A1* | 3/2011 | Ito et al. | 382/173 |
| 2011/0249910 A1* | 10/2011 | Henderson et al. | 382/278 |
| 2012/0177302 A1* | 7/2012 | Habuka et al. | 382/274 |
| 2012/0237137 A1* | 9/2012 | Chen | 382/284 |
| 2013/0251194 A1* | 9/2013 | Schamp | 382/103 |
| 2013/0272577 A1* | 10/2013 | Sakamoto | 382/103 |
| 2013/0287316 A1* | 10/2013 | Kaneko et al. | 382/284 |
| 2014/0037145 A1* | 2/2014 | Schamp | 382/104 |

* cited by examiner

FIG. 16

(A) INTENSITY IMAGE

| | u, v−1 | |
|---|---|---|
| u−1, v | u, v | u+1, v |
| | u, v+1 | |

(B) GRADIENT

I (u, v)

Ix = I (u+1, v) − I (u−1, v)

Iy = I (u, v+1) − I (u, v−1)

(C) GRADIENT MAGNITUDE $\quad m(u, v) = \sqrt{Ix^2 + Iy^2}$ (D) GRADIENT DIRECTION $\quad \theta(u, v) = \tan^{-1}\left[\dfrac{Iy}{Ix}\right]$

IMAGE PROCESSING DEVICE, IMAGE PROCESSING METHOD, AND IMAGE PROCESSING PROGRAM

CROSS REFERENCE TO RELATED APPLICATIONS

Priority is claimed on Japanese Patent Application No. 2012-063739, filed on Mar. 21, 2012, the contents of which are entirely incorporated herein by reference.

BACKGROUND OF THE INVENTION

1. Field of the Invention

The present invention relates to an image processing device, an image processing method, and an image processing program.

2. Background Art

Recently, techniques of extracting feature information from an image and recognizing an object have been used as a technique of recognizing a general object or recognizing a specific object. As a processing step of efficiently extracting the feature information, an integral image or an integral histogram (integral gradient image) is created.

Since the integral histogram is an integral image for each gradient direction, integral histograms corresponding to the number of gradient directions are necessary.

Recognition techniques using an integral image are described in Japanese Unexamined Patent Application, First Publication No. 2009-87253 (Patent Document 1), "Rapid Object Detection using a Boosted Cascade of Simple Features", Paul Viola, Michael Jones, Computer Vision and Pattern Recognition 2001 (Non-patent Document 1), and the like.

An adaptive cruise control (ACC) system, a collision avoiding (or reducing) system, a collision warning system, and the like are known as an in-vehicle object recognition device. As such systems, a spread of systems is expected which can recognize multiple types of target objects at a time, such as road traffic signs in addition to vehicles, motorcycles, bicycles, and pedestrians.

A spread of low-cost devices is also expected which can recognize multiple types of target objects using a single in-vehicle camera ECU (Electronic Control Unit). Pattern recognition has been often used for recognition of an object using an in-vehicle camera ECU. An object recognition algorithm using the pattern recognition is constructed by combining classifiers of AdaBoost, SVM (Support Vector Machine), or the like with feature values of Haar-like, HOG (Histograms of Oriented Gradients), or the like.

In the pattern recognition, in order to extract images of target objects from a captured image, an image region (window) from which objects are recognized is set to various sizes and the object recognition algorithm is performed for each window.

In order to efficiently acquire feature values for each window, the technique of creating an integral image or an integral histogram from which a cumulative value of a specific rectangular region in a window is acquired at a high speed is used.

An example of a process flow which is performed by an object recognition unit (for example, a processing unit corresponding to an object recognition unit 13 of a camera ECU 1 shown in FIG. 1) according to the background art will be described below with reference to FIGS. 20 and 21.

FIG. 20 is a flowchart illustrating an example of a process flow which is performed by an object recognition unit according to the background art.

First, the object recognition unit calculates intensity gradients for an image (step S1001).

Examples of calculation of the intensity gradients are shown in FIGS. 16 and 17.

Then, the object recognition unit creates an integral histogram of an arbitrary object recognition region in the entire image region (step S1002).

The process of creating an integral histogram is performed, for example, by any one or more of an FPGA (Field Programmable Gate Array), a DSP (Digital Signal Processor) and a microcomputer (for example, the same as included in the object recognition unit 13 of the camera ECU 1 shown in FIG. 1).

Here, the total volume of data of the integral histogram becomes a volume of data obtained by increasing the volume of data of the integral image by the number of gradient directions, in that the integral histogram is created for each intensity gradient direction calculated in the process of step S1001.

Then, the object recognition unit transmits data of the created integral histogram to a memory (for example, the same as a memory 23 included in the object recognition unit 13 of the camera ECU 1 shown in FIG. 1) (step S1003).

Subsequently, the object recognition unit performs an object recognition process (a pattern recognition process for object recognition in this example) with the data of integral histograms stored in the memory as input data (step S1004).

As described above, since the volume of data of the integral histogram is large for each gradient direction, it is necessary to design the integral histograms while preventing transmission to the memory in the process of step S1003 and access to the memory in the process of step S1003 from being interrupted.

FIG. 21 is a flowchart illustrating an example of an object recognition process (details of the process of step S1004 in the flowchart shown in FIG. 20) which is performed by the object recognition unit according to the background art.

In this example, a recognition algorithm is constructed by Haar-like feature values and classifiers (such as AdaBoost or SVM).

In this example, a window having a rectangular shape is used.

In the object recognition process (the process of step S1004), the object recognition unit first performs an extraction operation on the regions of the integral histograms stored in the memory with a predetermined coordinate region (window) as a raster scan process (step S1101). In this case, the object recognition unit accesses data of the integral histograms stored in the memory and acquires and uses the data.

Then, the object recognition unit calculates a feature vector as a feature value calculating process (step S1102). In this example, the object recognition unit calculates an HG feature value (vector) as the feature vector.

An example of calculation of the HOG feature value is shown in FIG. 17.

As the HOG feature value, a window is partitioned into small cell units, a rectangular region based on the integral histogram is applied to the cell units, and a cumulative value of the rectangular region is calculated by adding and subtracting the cumulative values at four points. This operation is performed for each gradient direction to obtain a gradient histogram of the cell units.

Then, the object recognition unit recognizes an object (image of the object) which is set as a target in advance based on the calculated HOG feature value as a classification process using classifiers (step S1103).

In this example, real AdaBoost classifiers are used. The real Adaboost classifiers are set to classifiers including weak classifiers having learned the HOG feature values of target objects in advance and including appropriately weak classifiers.

Then, the object recognition unit confirms whether the raster scan process has completed (step S1104), and causes the window to slide over a raster scan region and sequentially repeatedly performs the processes of steps S1101 to S1104 until the raster scan process has completed.

In the raster scan process, for example, after the repeated processes end with the same window scale, the scale of the window or the scanning step are switched (changed), the window is caused to sequentially slide again, and these processes are repeatedly performed until the raster scan process has completed.

SUMMARY OF THE INVENTION

However, an image region of which the integral historgram (or the integral image) is created needs to be enlarged, as the number of types of target objects becomes larger, in recognition of a specific object as well as recognition of a general object.

For in-vehicle applications, for example, when the function of recognizing a road traffic sign (including a guidance sign) is included as a function thereof and the integral histogram (or the integral image) is used for the recognition, regions (for example, regions in which road traffic signs are present) of an upper part or left and right end portions of an image region (an image region for each gradient direction in the integral histogram) are included and thus the range is expanded substantially to the entire image region.

In this case, when the image region of the integral histogram (or the integral image) is set to a single wide range, the maximum cumulative value of the gradient magnitude (intensity in case of the integral image) increases and the necessary data length increases. For example, in a raster scan region of 640 pixels in the horizontal direction×480 pixels in the vertical direction, when it is assumed that the gradient magnitude can be expressed by 8 bits, a cumulative gradient magnitude value with a data length (bit length) of 27 bits (the number of bits capable of expressing 640×480×256) is necessary.

However, in order to enhance efficiency of transmission of an integral histogram (or an integral image) to a memory or access of a CPU (Central Processing Unit) to the memory, it is preferable that the bit length be reduced as much as possible. In order to reduce the bit length, for example, bits of the cumulative gradient magnitude value are deleted. However, in this case, there is a problem in that the amount of information is reduced and thus a cumulative value (which is a feature value) of a desired rectangular region is not acquired.

The present invention is made in consideration of the above-mentioned circumstances and an object thereof is to provide an image processing device, an image processing method, and an image processing program which can efficiently obtain a cumulative value of a predetermined range (region).

(1) To achieve the above-mentioned object, an image processing device according to an aspect of the present invention includes: an image acquiring unit configured to acquire an image; a storage unit configured to store information on a cumulative value of a value associated with a predetermined pixel for each sub-region, which is obtained by dividing an image region into a plurality of sub-regions, in the image acquired by the image acquiring unit; and an image processing unit configured to acquire a cumulative value of a value of a pixel of the image acquired by the image acquiring unit in a rectangular range set in the image region based on the information stored in the storage unit, wherein the image region is divided into a plurality of sub-regions in the vertical direction, and wherein when the rectangular range set in the image region extends over two or more sub-regions, the image processing unit acquires the cumulative value at a pixel position in the lowermost sub-region of the two or more sub-regions by adding the cumulative values in the upper sub-regions at the pixel position in the same column of a lowermost row in the upper sub-regions, over which the rectangular range extends, to the cumulative value in the lowermost sub-region at the pixel position in the lowermost sub-region.

(2) To achieve the above-mentioned object, an image processing device according to another aspect of the present invention includes: an image acquiring unit configured to acquire an image; a storage unit configured to store information on a cumulative value of a value associated with a predetermined pixel for each sub-region, which is obtained by dividing an image region into a plurality of sub-regions, in the image acquired by the image acquiring unit; and an image processing unit configured to acquire a cumulative value of a value of a pixel of the image acquired by the image acquiring unit in a rectangular range set in the image region based on the information stored in the storage unit, wherein the image region is divided into a plurality of sub-regions in the horizontal direction, and wherein when the rectangular range set in the image region extends over two or more sub-regions, the image processing unit acquires the cumulative value at a pixel position in the rightmost sub-region of the two or more sub-regions by adding the cumulative values in the left sub-regions at the pixel position in the same row of a rightmost column in the left sub-regions, over which the rectangular range extends, to the cumulative value in the rightmost sub-region at the pixel position in the rightmost sub-region.

(3) In the image processing device according to (1) or (2), when the rectangular range set in the image region is received in one sub-region, the image processing unit may acquire the cumulative value of a value of a pixel in the image acquired by the image acquiring unit with the rectangular range using information of the cumulative value in the corresponding region at pixel positions of four vertices of the rectangular range stored in the storage unit.

(4) In the image processing device according to any one of (1) to (3), the storage unit may store information on cumulative values of pixels, which are included in a range of a rectangular portion having a predetermined reference pixel position and each pixel position as diagonal vertices, as the information on the cumulative value at each pixel position for each sub-region, which is obtained by dividing the image region into a plurality of sub-regions, in the image acquired by the image acquiring unit.

(5) In the image processing device according to any one of (1) to (4), an intensity value of a pixel may be used as the value associated with the pixel, and an integral image may be used as an integrated value of the value associated with the pixel.

(6) In the image processing device according to any one of (1) to (4), a gradient value of a pixel for each gradient direction may be used as the value associated with the pixel, and an integral histogram for each gradient direction may be used as an integrated value of the value associated with the pixel.

(7) To achieve the above-mentioned object, an image processing method according to still another aspect of the present invention includes: causing an image acquiring unit to acquire an image; and causing an image processing unit to acquire a cumulative value of a value associated with a pixel of the image acquired by the image acquiring unit in a rectangular range set in an image region based on information stored in a storage unit, which is configured to store information on a cumulative value of a value associated with a predetermined pixel for each sub-region, which is obtained by dividing an image region into a plurality of sub-regions in the vertical direction, in the image acquired by the image acquiring unit, and to acquire the cumulative value at a pixel position in the lowermost sub-region of two or more sub-regions by adding the cumulative values in the upper sub-regions at the pixel position in the same column of a lowermost row in the upper sub-regions, over which the rectangular range extends, to the cumulative value in the lowermost sub-region at the pixel position in the lowermost sub-region when the rectangular range set in the image region extends over the two or more sub-regions.

(8) To achieve the above-mentioned object, an image processing method according to still another aspect of the present invention includes: causing an image acquiring unit to acquire an image; and causing an image processing unit to acquire a cumulative value of a value associated with a pixel of the image acquired by the image acquiring unit in a rectangular range set in an image region based on information stored in a storage unit, which is configured to store information on a cumulative value of a value associated with a predetermined pixel for each sub-region, which is obtained by dividing an image region into a plurality of sub-regions in the horizontal direction, in the image acquired by the image acquiring unit, and to acquire the cumulative value at a pixel position in the rightmost sub-region of two or more sub-regions by adding the cumulative values in the left sub-regions at the pixel position in the same row of a rightmost column in the left sub-regions, over which the rectangular range extends, to the cumulative value in the rightmost sub-region at the pixel position in the rightmost sub-region when the rectangular range set in the image region extends over the two or more sub-regions.

(9) To achieve the above-mentioned object, an image processing program according to still another aspect of the present invention causes a computer to perform: a sequence of causing an image acquiring unit to acquire an image; and a sequence of causing an image processing unit to acquire a cumulative value of a value associated with a pixel of the image acquired by the image acquiring unit in a rectangular range set in an image region based on information stored in a storage unit, which is configured to store information on a cumulative value of a value associated with a predetermined pixel for each sub-region, which is obtained by dividing an image region into a plurality of sub-regions in the vertical direction, in the image acquired by the image acquiring unit, and to acquire the cumulative value at a pixel position in the lowermost sub-region of two or more sub-regions by adding the cumulative values in the upper sub-regions at the pixel position in the same column of a lowermost row in the upper sub-regions, over which the rectangular range extends, to the cumulative value in the lowermost sub-region at the pixel position in the lowermost sub-region when the rectangular range set in the image region extends over the two or more sub-regions.

(10) To achieve the above-mentioned object, an image processing program according to still another aspect of the present invention causes a computer to perform: a sequence of causing an image acquiring unit to acquire an image; and a sequence of causing an image processing unit to acquire a cumulative value of a value associated with a pixel of the image acquired by the image acquiring unit in a rectangular range set in an image region based on information stored in a storage unit, which is configured to store information on a cumulative value of a value associated with a predetermined pixel for each sub-region, which is obtained by dividing an image region into a plurality of sub-regions in the horizontal direction, in the image acquired by the image acquiring unit, and to acquire the cumulative value at a pixel position in the rightmost sub-region of two or more sub-regions by adding the cumulative values in the left sub-regions at the pixel position in the same row of a rightmost column in the left sub-regions, over which the rectangular range extends, to the cumulative value in the rightmost sub-region at the pixel position in the rightmost sub-region when the rectangular range set in the image region extends over the two or more sub-regions.

As described above, according to the aspects of the present invention, it is possible to provide an image processing device, an image processing method, and an image processing program which can efficiently obtain a cumulative value of a predetermined range (region).

Part (A) of FIG. 16 is an expression illustrating an example of an intensity image, Part (B) thereof is an expression illustrating an example of a gradient, Part (C) thereof is an expression illustrating an example of a gradient magnitude, and Part (D) thereof is an expression illustrating an example of a gradient direction.

Figure 17:
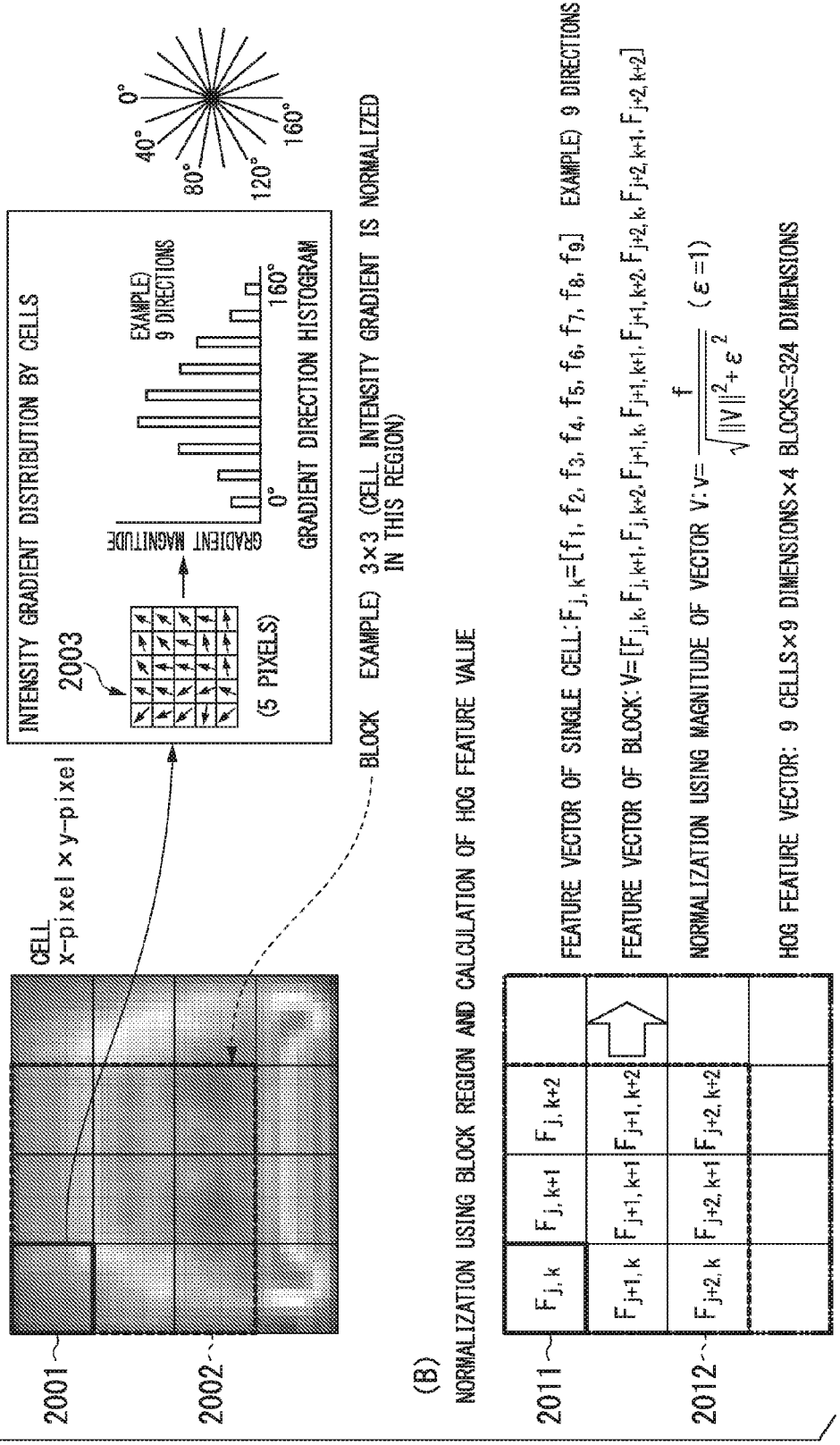

Part (A) and Part (B) of FIG. 17 are diagrams illustrating HOG feature values.

Figure 18:
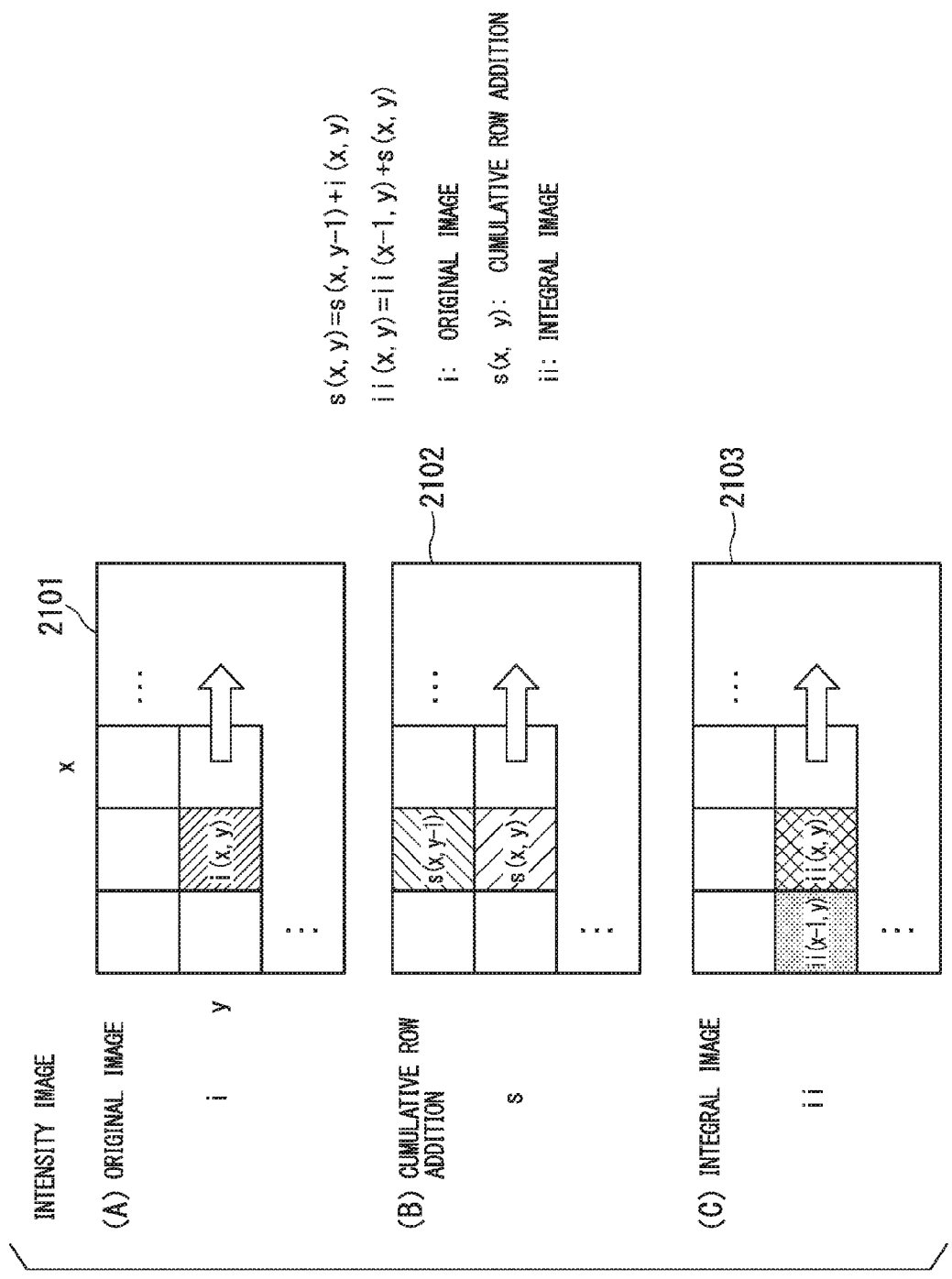

Part (A) of FIG. 18 is a diagram illustrating an example of an original image, Part (B) thereof is a diagram illustrating an example of a result of cumulative row addition, and Part (C) thereof is a diagram illustrating an example of an integral image.

Figure 19:
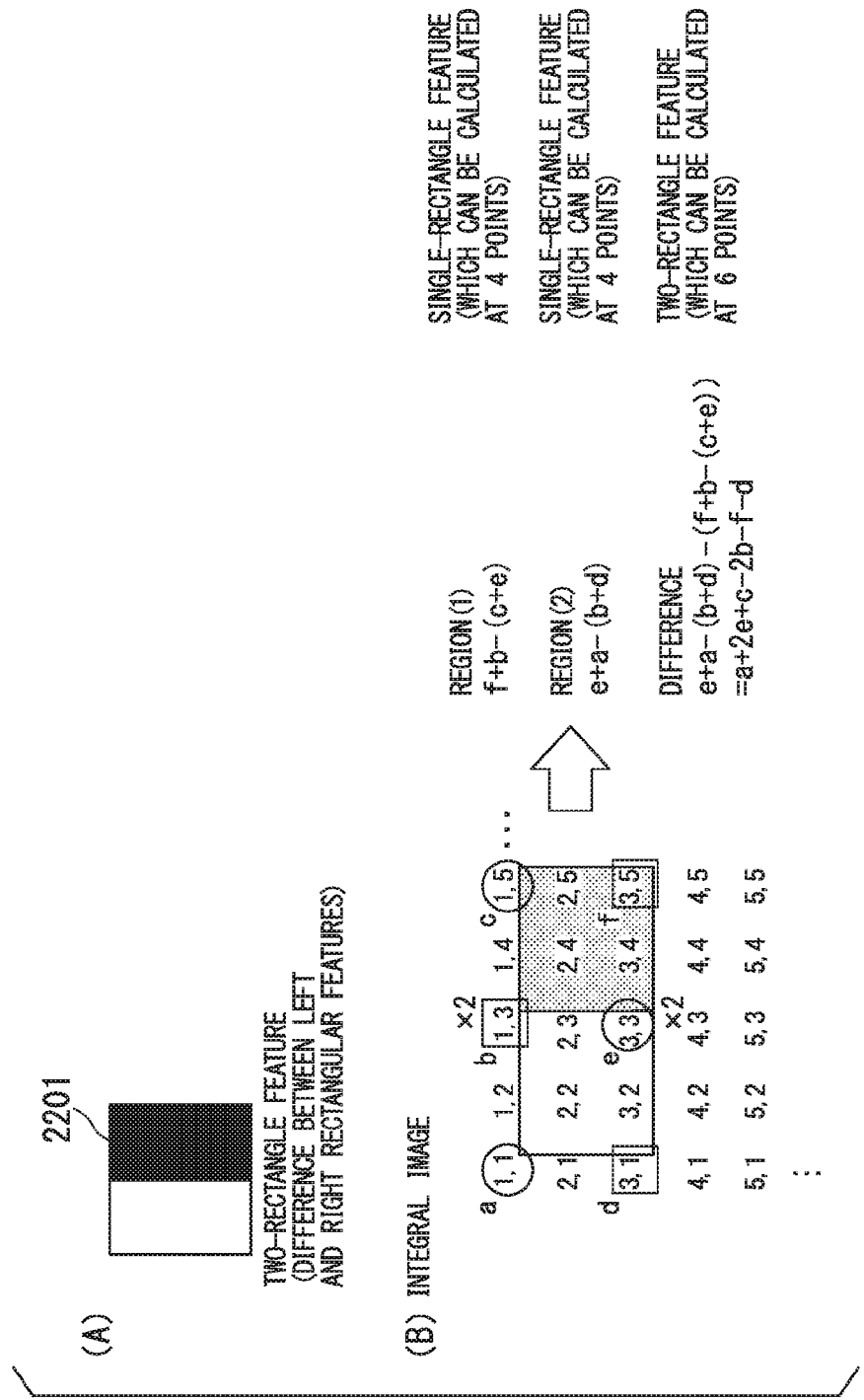

Part (A) and Part (B) of FIG. 19 are diagrams illustrating Haar-like feature values.

Figure 20:
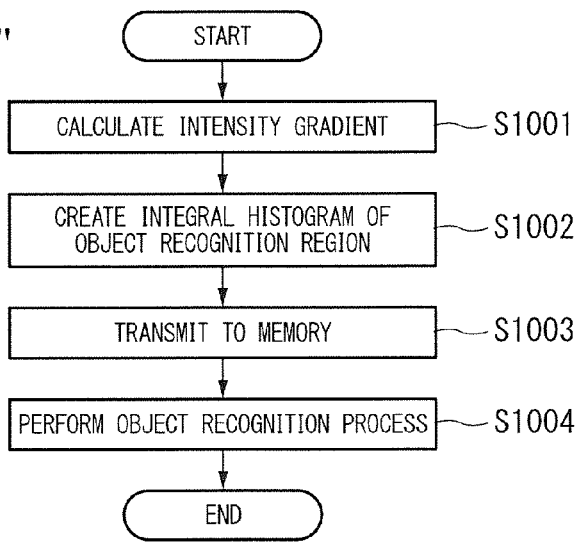

FIG. 20 is a flowchart illustrating an example of a process flow which is performed by an object recognition unit according to the background art.

Figure 21:
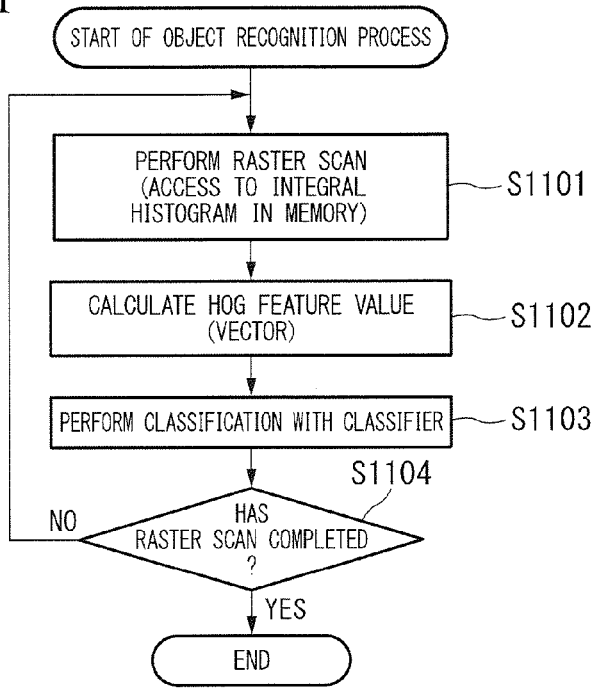

FIG. 21 is a flowchart illustrating an example of a process flow which is performed by the object recognition unit according to the background art.

DETAILED DESCRIPTION OF THE INVENTION

Description of Terms

A gradient-direction feature value is a feature value associated with a gradient direction and a gradient magnitude of intensity of an image. Known gradient frequencies with a reduced information volume can be used as the gradient magnitude. In this specification, an extensive gradient value including the gradient magnitude and the gradient frequency is defined as a gradient value.

In this specification, an integral gradient image (integral histogram) is a result (integral gradient value) obtained by calculating the gradient direction and the gradient value of intensity of an image and integrating the gradient value of each gradient direction. Here, the integration is performed, for example, on all pixels included in a region from which an integral gradient image should be calculated.

In this specification, "integration" and "addition" are substantially the same process, and "integration" may be used as another configuration example in a case using "addition" or "addition" may be used as another configuration example in a case using "integration".

Examples of a classifier include various classifiers such as a real AdaBoost classifier, an AdaBoost classifier, and an SVM classifier.

A subordinate concept of the classifier includes a classifier used to perform statistical learning, a subordinate concept thereof includes a boosting classifier, and a subordinate concept thereof includes a real AdaBoost classifier.

Here, boosting includes performing statistical learning using multiple weak classifiers.

A rectangle includes a square as well as a rectangle.
(First Embodiment)

In this embodiment, an in-vehicle image processing system which is mounted on a vehicle and which performs an object recognition process will be described as an example.

Figure 1:
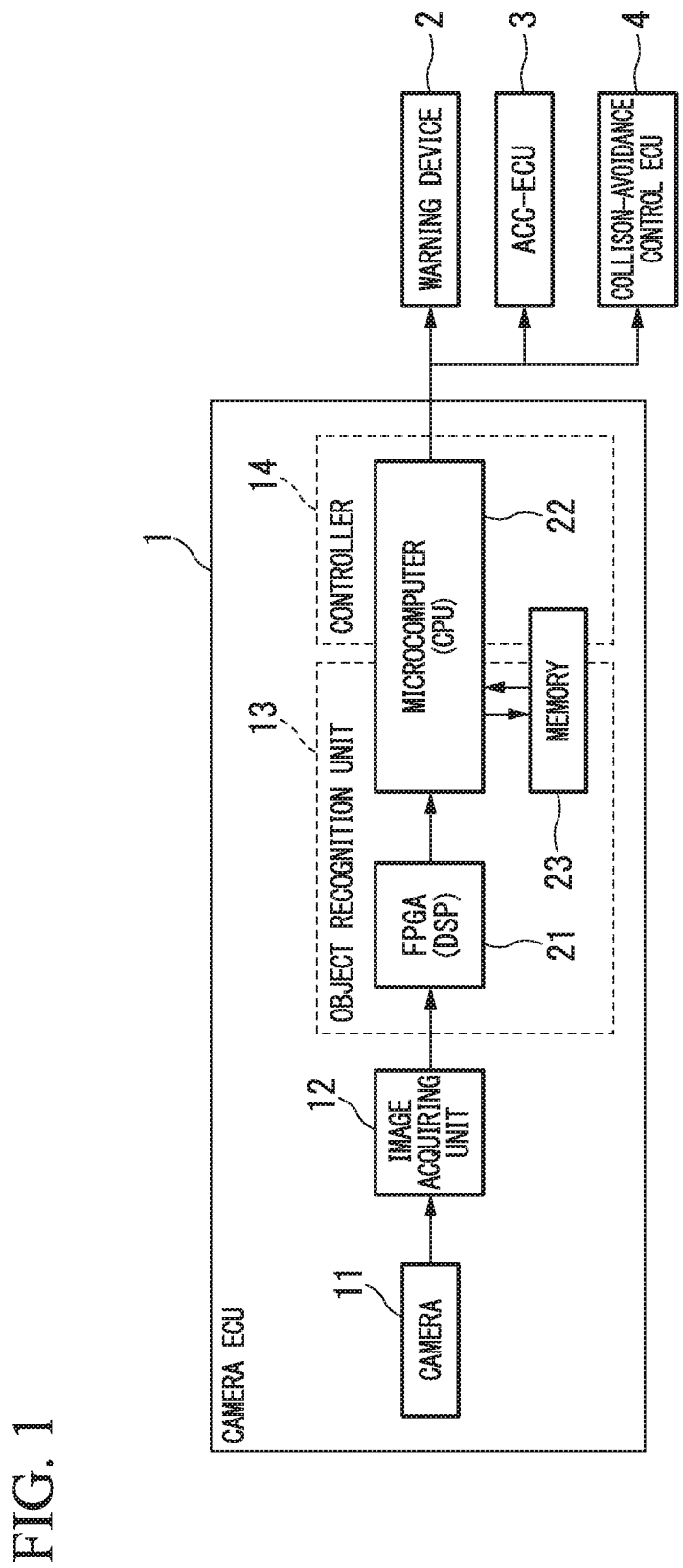
FIG. 1 is a block diagram schematically illustrating a configuration (hardware configuration) of an image processing system according to an embodiment of the present invention.

FIG. 1 is a block diagram schematically illustrating a configuration (hardware configuration) of an image processing system according to an embodiment of the present invention.

The image processing system according to this embodiment includes a camera ECU (Electronic Control Unit) 1, a warning device 2, an ACC ECU 3, and a collision-avoidance control ECU 4.

The camera ECU 1 is an example of an image processing device.

The camera ECU 1 includes a camera 11, an image acquiring unit 12, an object recognition unit (an example of an image processing unit) 13, and a controller 14.

The object recognition unit 13 is constructed using the function of an FPGA 21, the function of a microcomputer 22, and the function of a memory (an example of a storage unit) 23.

In this embodiment, the function of a DSP may be used instead of the function of the FPGA 21 or in addition to the function of the FPGA 21.

In this embodiment, the controller 14 is constructed, for example, using the function of the microcomputer 22 having a CPU and the function of the memory 23.

The memories 23 and the peripheral circuits of the object recognition unit 13 and the controller 14 may employ memories and peripheral circuits stored in integrated circuits of the FPGA, the DSP, or the microcomputer or may be disposed outside them.

In the object recognition unit 13 and the controller 14, an arbitrary number of devices may be used for the devices such as the FPGA, the DSP, and the microcomputer. For example, all devices may be used, or all processing functions may be mounted on a single device or two devices without using all the devices.

Processing units of the image processing system according to this embodiment will be described in brief below.

For example, the camera 11 is disposed at a vehicle position for capturing an image of a predetermined direction, such as a front side, a lateral side, or a rear side of a vehicle. In this embodiment, the camera 11 is disposed at the vehicle position at which a target object in front of the vehicle can be imaged and recognized.

The camera 11 captures an image and outputs signals of the captured image to the image acquiring unit 12.

The image acquiring unit 12 receives the image from the camera 11 as image data and outputs the received image data to the object recognition unit 13.

The object recognition unit 13 performs an image processing operation and a pattern recognition operation on the image data input from the image acquiring unit 12 by the use of the FPGA 21 or the microcomputer 22 for the purpose of recognizing an object and outputs result information of the object recognition process to the controller 14. For example, a filtering process as a pre-process is performed as the image process.

For example, information of a target object in the image of the image data is used as the result information of the pattern recognition.

The memory 23 stores a variety of information.

In this embodiment, for example, data of an integral histogram (or an integral image) is created by the FPGA 21 (or the DSP) or the microcomputer 22 and is transmitted to stored in the memory 23.

The controller 14 performs a predetermined process based on the result information of the object recognition process input from the object recognition unit 13, and outputs the result information to the warning device 2 or the ACC ECU 3 or the collision-avoidance control ECU 4.

In a specific example, the controller 14 performs a process of calculating a TTC (Time-to-Collision) or a distance to a target object, a process of tracking a target object, a process of communicating with an application function of another device or ECU (the warning device 2 or the ACC ECU 3 or the collision-avoidance control ECU 4 in this embodiment), and the like as a predetermined process based on information of a target object which is the result information of an object recognition process input from the object recognition unit 13.

The warning device 2 or the ACC ECU 3 or the collision-avoidance control ECU 4 is disposed to execute the application functions through the use of the controller 14 of the camera ECU 1.

The warning device 2 warns a driver, for example, about forward vehicle collision when a target object is a forward vehicle, or pedestrian collision when a target object is a pedestrian based on information input from the control unit 14.

The ACC ECU 3 performs adaptive cruise control and the like, for example, when a target object is a forward vehicle based on information input from the control unit 14.

The collision-avoidance control ECU 4 performs, for example, a collision avoidance control when a target object is a forward vehicle, or a pedestrian collision avoidance control when a target object is a pedestrian based on information input from the controller 14. The collision-avoidance control ECU 4 interlocks, for example, with a brake control or a steering control.

Processes performed by the object recognition unit 13 according to this embodiment will be described below.

An integral histogram will be described below as an example, but an integral image may be used in another configuration example.

Figure 2:
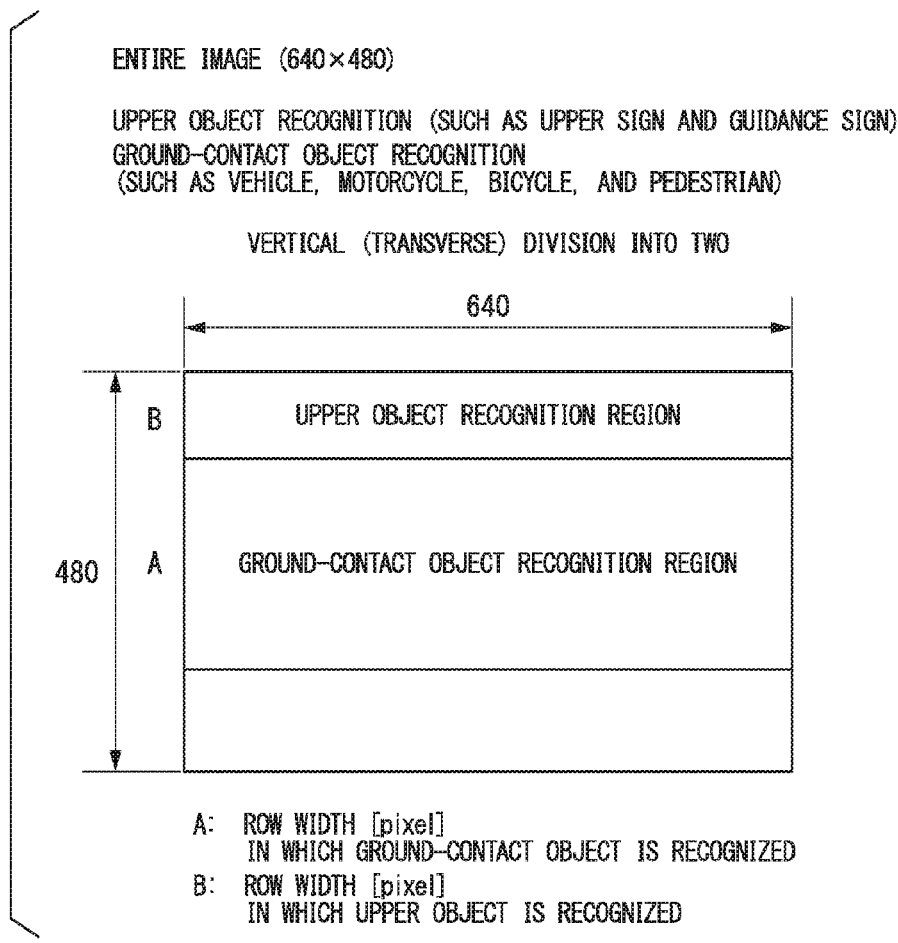
FIG. 2 is a diagram illustrating an example of integral histogram sub-regions according to a first embodiment of the present invention.

FIG. 2 is a diagram illustrating an example of integral histogram sub-regions according to this embodiment.

In this embodiment, it is assumed that an image (entire image) captured by the camera 11 is an image of 640 pixels in the horizontal direction×480 pixels in the vertical direction.

In this embodiment, a used region in the entire image is vertically (transversely) divided into two regions which are a ground-contact object recognition region on the lower side and an upper object recognition region on the upper side.

In this embodiment, a region below the ground-contact object recognition region is a nonuse region.

The ground-contact object recognition region is a region for mainly detecting objects (ground-contact object) contacting the ground and being present in a region having possibility of collision with a vehicle, such as a vehicle, a motorcycle, a bicycle, and a pedestrian. The ground-contact object recognition region is a section of rows of which the row width is A (pixel).

The upper object recognition region is a region for mainly detecting objects (upper objects) such as a road traffic sign (including a guidance sign) on the upper side. The upper object recognition region is a section of rows of which the additional row width capable of recognizing the upper objects is B (pixel).

The nonuse region is a section of rows of which the nonuse row width is (480-A-B) (pixel).

For example, the method of dividing the entire image region is set in advance and is stored in the memory 23 or the like. Specifically, information for specifying a region serving as the upper object recognition region in the entire image region, information for specifying a region serving as the ground-contact object recognition region, or information for specifying a region serving as the nonuse region is stored in the memory 23 or the like.

In another configuration example, the method of dividing the entire image region may be adaptively set depending on the behavior of the vehicle or the captured image or may be set in accordance with an instruction input from a user.

Here, the summed region of the sub-regions such as the upper object recognition region and the ground-contact object recognition region may be, for example, the entire image region or a part of the entire image region. The nonuse region may be provided or may not be provided.

Figure 3:
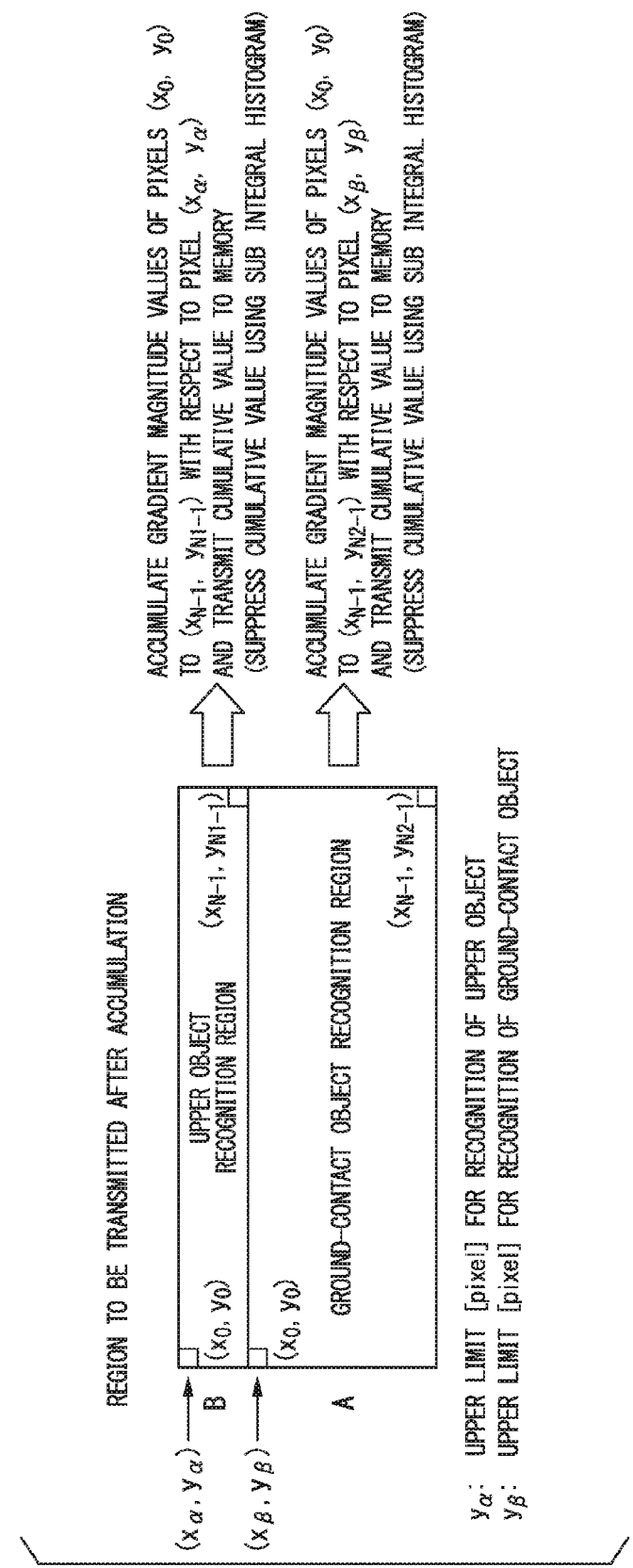
FIG. 3 is a diagram illustrating details of integral histogram sub-regions according to the first embodiment of the present invention.

FIG. 3 is a diagram illustrating details of the integral histogram sub-regions according to this embodiment.

In this embodiment, regarding a pixel constituting an image, the pixel position (coordinate value) in the horizontal direction is expressed by x (pixel) and the pixel position (coordinate value) in the vertical direction is expressed by y (pixel).

In this embodiment, the left-top pixel position of an image is defined as an origin (0, 0), the value of x increases toward the right side in the horizontal direction, and the value of y increases toward the lower side in the vertical direction. The addition expression is expressed by Equation (1).

Here, $i(x, y)$ represents the value to be added at a pixel position (x, y). A value of a gradient magnitude is used as the value to be added in this embodiment, but other values may be used.

$ii(x_n, y_n)$ represents the cumulative value.

$(x_0, y_0)$ represents the origin (pixel position) for calculating the cumulative value.

$(x_n, y_n)$ represents an arbitrary point (pixel position).

In $(x_{N-1}, y_{N1-1})$, (N−1) is 639 and (N1−1) is a value indicating the lowermost row in the upper object recognition region.

In $(x_{N-1}, y_{N2-1})$, (N−1) is 639 and (N1−1) is a value indicating the lowermost row in the ground-contact object recognition region.

$$ii(x_n, y_n) = \sum_{y=y_0}^{y_n} \sum_{x=x_0}^{x_n} i(x, y) \qquad (1)$$

In this embodiment, the upper object recognition region has a rectangular shape, the left-top pixel position thereof is defined as $(x_\alpha, y_\alpha)$, and the right-bottom pixel position thereof is defined as $(x_{N-1}, y_{N1-1})$.

In the upper object recognition region, the object recognition unit 13 adds the gradient magnitude values $i(x, y)$ from $(x_0, y_0)=(x_\alpha, y_\alpha)$ to $(x_n, y_n)=(x_{N-1}, y_{N1-1})$ with the pixel position $(x_\alpha, y_\alpha)$ as a reference point and transmits the cumulative value $ii(x_n, y_n)$ to the memory 23.

Here, $(x_{N-1}, y_{N1-1})$ represents the pixel position of an intersection between the 639-th (=N−1) column and the (N1−1)-th row in the B section.

$y_\alpha$ represents the upper limit pixel position (pixel) for recognizing an upper object.

The cumulative value can be suppressed by using such integral histogram sub-regions. For example, when the integral histogram is divided into 640 pixels in the horizontal direction×100 pixels in the vertical direction, 24 bits (the number of bits capable of expressing 640×100×256) is necessary and it is thus possible to realize the data length reduction of the cumulative gradient magnitude value corresponding to three bits which does not influence accuracy.

In this embodiment, the ground-contact object recognition region has a rectangular shape, the left-top pixel position thereof is defined as $(x_\beta, y_\beta)$, and the right-bottom pixel position thereof is defined as $(x_{N-1}, y_{N2-1})$.

In the ground-contact object recognition region, the object recognition unit 13 adds the gradient magnitude values $i(x, y)$ from $(x_0, y_0)=(x_\beta, y_\beta)$ to $(x_n, y_n)=(x_{N-1}, y_{N2-1})$ with the pixel position and transmits the cumulative value $ii(x_n, y_n)$ to the memory 23.

Here, $(x_{N-1}, y_{N2-1})$ represents the pixel position of an intersection between the 639-th (=N−1) column and the (N2−1)-th row in the A section.

$y_\beta$ represents the upper limit pixel position (pixel) for recognizing an ground-contact object.

The cumulative value can be suppressed by using such integral histogram sub-regions.

Figure 4:
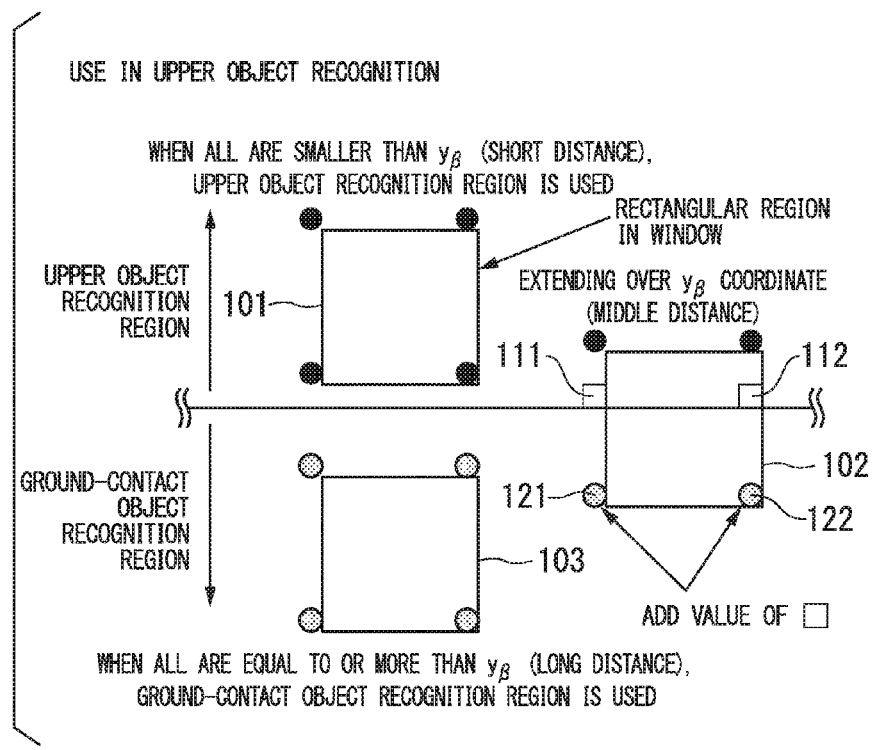
FIG. 4 is a diagram illustrating an example where a rectangular region in a window extends over sub-regions and an example where the rectangular region does not extend over sub-regions.

FIG. 4 is a diagram illustrating an example where a rectangular region in a window extends over sub-regions and an example where the rectangular region does not extend over sub-regions.

When the rectangular region does not extend over the sub-regions and the values of y at all the pixel positions is smaller than $y_\beta$ like rectangular region 101 in the window (for example, in case of a short distance), the upper object recognition region is used.

When the rectangular region does not extend over the sub-regions and the values of y at all the pixel positions is equal to or more than $y_\beta$ like rectangular region 103 in the window (for example, in case of a long distance), the ground-contact object recognition region is used.

When the rectangular region extends over the sub-regions and a portion in which the value of y at a pixel position is smaller than $y_\beta$ and a portion in which the value of y at a pixel position is equal to or more than $y_\beta$ are present like rectangular region 102 in the window (for example, in case of a middle distance), the gradient magnitude cumulative value of two points 111 and 112 in the same column in the lowermost row of the upper object recognition region on the upper side is added to the gradient magnitude cumulative value of two points 121 and 122 in the ground-contact object recognition region on the lower side. Accordingly, the same cumulative value as the cumulative value when the region is not divided is obtained.

For example, when a vehicle having the camera 11 mounted on the front side thereof moves forward and an object to be an upper object in the near future is still present at a long distance, the object is imaged in the ground-contact object recognition region on the lower side. When the object is present at a middle distance, the object is imaged to extend over the sub-regions. When the object is present at a short distance, the object is imaged in only the upper object recognition region.

Here, the object recognition process in the rectangular region in a window which extends over the sub-regions may be performed, for example, using an upper object recognition process, may be performed using a ground-contact object recognition process, may be performed using both processes, or may be performed using a process (for example, a process of recognizing an object having a possibility of extending over the sub-region) other than the processes.

Figure 5:
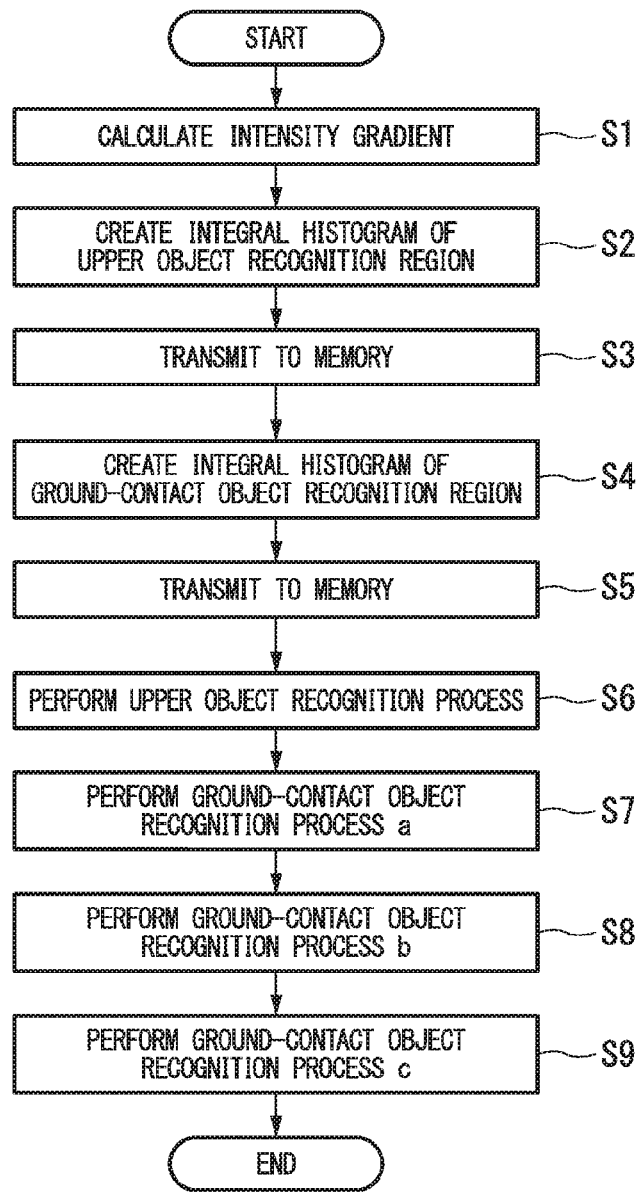
FIG. 5 is a flowchart illustrating an example of a process flow which is performed by an object recognition unit according to the first embodiment of the present invention.

FIG. 5 is a flowchart illustrating an example of a process flow which is performed by the object recognition unit 13 according to this embodiment.

Here, the flowchart shown in FIG. 5 is on the premise that an integral histogram is vertically (transversely) divided into two sub-regions as shown in FIG. 2, additionally includes creation of sub integral histograms and transmission to the memory (steps S2 to S5) in comparison with the flowchart according to the background art shown in FIG. 20, and causes the additional steps to correspond to four types of object recognition (steps S6 to S9).

First, the object recognition unit 13 calculates a gradient of intensity in an image to be processed (from which a target object will be recognized in this embodiment) (step S1).

Then, the object recognition unit 13 creates an integral histogram of the upper object recognition region (step S2).

The process of creating the integral histogram is performed, for example, by any one or more of the FPGA 21 (or the DSP) and the microcomputer 22.

Then, the object recognition unit 13 transmits data of the created integral histogram of the upper object recognition region to the memory 23 (step S3).

Subsequently, the object recognition unit 13 creates an integral histogram of the ground-contact object recognition region (step S4).

Then, the object recognition unit 13 transmits the created integral histogram of the ground-contact object recognition region to the memory 23 (step S5).

The processes of steps S2 to S5 are shown in FIG. 3.

Then, the object recognition unit 13 performs an object recognition process (a pattern recognition process for object recognition in this embodiment) with the data of the integral histogram stored in the memory 23 as input data (steps S6 to S9).

Specifically, the object recognition unit 13 performs an upper object recognition process (step S6), performs a ground-contact object recognition process a (step S7), performs a ground-contact object recognition process b (step S8), and performs a ground-contact object recognition process c (step S9).

In the upper object recognition process, a process of mainly recognizing an object present on the upper side (for example, a region above the vehicle) of the image is performed.

In the ground-contact object recognition process, a process of mainly recognizing an object present on the lower side (for example, a region having possibility of collision with the vehicle) of the image in comparison with the upper side of the image is performed.

The ground-contact object recognition process a, the ground-contact object recognition process b, and the ground-contact object recognition process c are processes of recognizing different ground-contact objects. Examples of the different ground-contact objects include a vehicle, a motorcycle, a bicycle, and a pedestrian.

Figure 6:
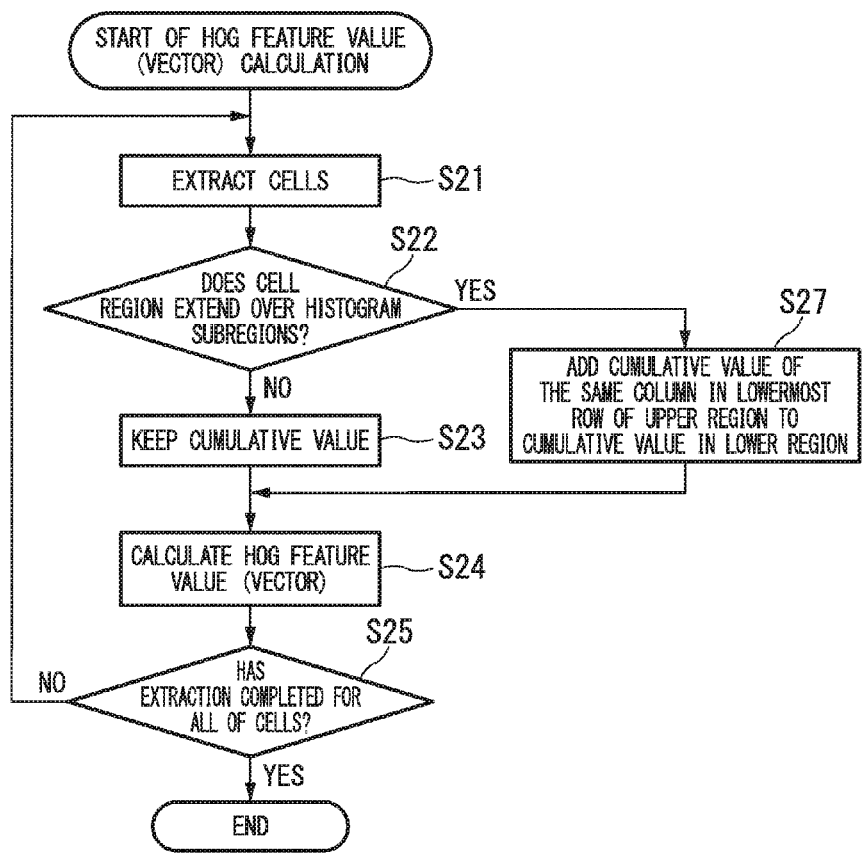
FIG. 6 is a flowchart illustrating an example of a process flow of calculating an HOG feature value (vector), which is performed by the object recognition unit according to the first embodiment of the present invention.

FIG. 6 is a flowchart illustrating an example of a process flow of calculating an HOG feature value (vector), which is performed by the object recognition unit 13 according to this embodiment.

In this embodiment, calculation of a feature value using an HOG feature value is realized.

In this embodiment, a window has a rectangular shape.

Here, the flowchart shown in FIG. 6 corresponds to the HOG feature value (vector) calculating step (step S1102) in the flowchart according to the background art shown in FIG. 21. Therefore, the process of FIG. 21 performing the process flow of FIG. 6 is reflected in steps S6 to S9.

The object recognition processes shown in step S6 to S9 may be performed, for example, independently. In this case, the same process flow as in the flowchart shown in FIG. 6 is performed for each object recognition process. In another configuration example, multiple types of object recognition processes shown in steps S6 to S9 may be performed collectively. In this case, the same process flow as in the flowchart shown in FIG. 6 is commonly performed for the multiple types of object recognition processes.

In the object recognition processes (the processes of steps S6 to S9), first, as shown in FIG. 21, the object recognition unit 13 performs extraction from the integral histogram region stored in the memory with a predetermined coordinate region (window) as a raster scan process (step S1101). In this case, the object recognition unit 13 accesses the data of the integral histogram stored in the memory 23, and acquires and uses the data.

In this embodiment, for example, when the upper object recognition process (step S6), the ground-contact object recognition process a (step S7), the ground-contact object recognition process b (step S8), and the ground-contact object recognition process c (step S9) are performed independently, the raster scan region may vary.

In the HOG feature value (vector) calculating process of the object recognition process (the processes of steps S6 to S9), the object recognition unit 13 first extracts cells (step S21).

Then, the object recognition unit 13 determines whether the rectangular region (cell in the HOG feature value in this embodiment) in a window extends over the sub histogram regions (step S22).

When it is determined in the process of step S22 that the rectangular region in the window does not extend over the integral histogram sub-regions, the object recognition unit 13 uses the cumulative value (the data of the integral histogram) read from the memory 23 without any change (step 23) and then performs the process of step S24.

On the other hand, when it is determined in the process of step S22 that the rectangular region in the window extends over the integral histogram sub-regions, the object recognition unit 13 uses the result of adding the cumulative value of the same column of the lowermost row in the upper region (the upper object recognition region in this embodiment) to the cumulative value of the lower region (the ground-contact object recognition region in this embodiment) in the cumulative value (the data of the integral histogram) read from the memory 23 (step S27) and then performs the process of step S24.

The process of step S23 and the process of step S27 are shown in FIG. 4.

Then, in the process of step S24, the object recognition unit 13 calculates a feature vector as a feature value calculating process (step S24). In this embodiment, the object recognition unit 13 calculates an HOG feature value (vector) as the feature vector.

An example of calculation of the HOG feature value is shown in FIG. 17.

As the HOG feature value, a window is partitioned into small cell units, a rectangular region based on the integral histogram is applied to the cell units, and a cumulative value of the rectangular region is calculated by adding and subtracting the cumulative values at four points. This operation is performed for each gradient direction to obtain a gradient histogram of the cell units.

Then, the object recognition unit 13 confirms whether the process of extracting the rectangular region in the window (extraction of all cells in this embodiment) ends (step S25), and repeatedly and sequentially performs the processes of steps S21 to S25 and the process of step S27 until the process of extracting the rectangular region in the window ends.

As described above, in the process of step S27, when the pixel positions of the cumulative values of four points in the rectangular region obtained to extract the feature value in the window extend over the integral histogram sub-regions, a process of adding the cumulative value of the same column of the lowermost row in the upper region to the cumulative value of the lower region is performed. Accordingly, even in the divided integral histograms, the cumulative value of four points is surely calculated and thus the cumulative value of the rectangular region can be calculated.

The cumulative value of the rectangular region is shown in FIGS. 18 and 19.

Then, as shown in FIG. 21, the object recognition unit 13 recognizes an object (image of the object) which is set as a target in advance based on the calculated HOG feature value as a classification process using classifiers (step S1103).

In this embodiment, real AdaBoost classifiers are used. The real Adaboost classifiers are set to classifiers having learned the HOG feature values of target objects in advance and including appropriately weak classifiers.

In this embodiment, for example, different target objects can be recognized through the upper object recognition process (step S6), the ground-contact object recognition process a (step S7), the ground-contact object recognition process b (step S8), and the ground-contact object recognition process c (step S9), respectively.

Then, the object recognition unit 13 confirms whether the raster scan process has completed (step S1104) as shown in FIG. 21, causes the window to slide over the raster scan region, and sequentially repeatedly performs the process of step S1101 to S1101, the process (the process corresponding to step S1102) shown in FIG. 6, the process of step S1103, and the process of step S1104 until the raster scan process has completed.

In the raster scan process, for example, after the repeated processes end with the same window scale, the scale of the window or the scanning step are switched (changed), the window is caused to sequentially slide again, and these processes are repeatedly performed until the raster scan process has completed.

Figure 7:
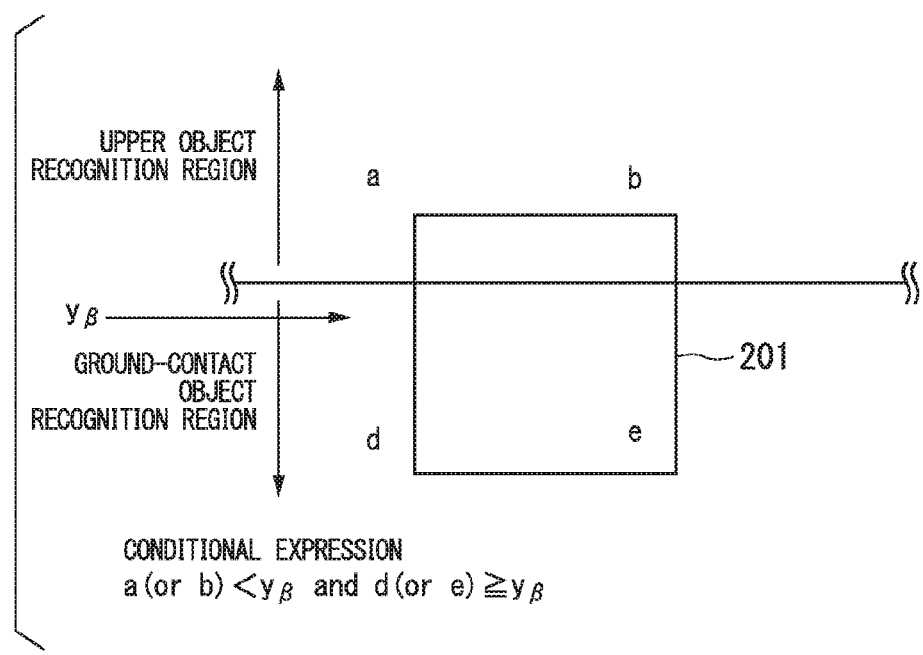
FIG. 7 is a diagram illustrating an example of a method of determining whether a rectangular region in a window extends over sub-regions.

FIG. 7 is a diagram illustrating an example of the method of determining whether the rectangular region in the window extends over sub-regions in the process of step S22.

An upper object recognition region, a ground-contact object recognition region, and a rectangular region 201 in a window are shown in FIG. 7.

In the example shown in FIG. 7, In the rectangular region 201 in the window, the value of y at the pixel position of the left-top vertex is a, the value of y at the pixel position of the right-top vertex is b, the value of y at the pixel position of the left-bottom vertex is d, and the value of y at the pixel position of the right-bottom vertex is e.

In the example shown in FIG. 7, $y_\beta$ represents the y coordinate value (pixel) of the image corresponding to the reference uppermost row of the integral histogram of the lower region (the ground-contact object recognition region in this embodiment). The value of $y_\beta$ can be set, for example, arbitrarily, and may be adaptively set depending on the behavior of the vehicle or the captured image or may be set in accordance with an instruction input from a user.

The conditional expression for determining whether the rectangular region 201 in the window extends over the sub-regions is expressed by Expression (2).

That is, in this embodiment, when the value of y (a or b) of the upper part of the extracted rectangular region is smaller than $y_\beta$ and the value of y (d or e) of the lower part of the rectangular region is equal to or more than $y_\beta$, it is determined that the rectangular region extends over the upper and lower integral histogram sub-regions.

$$a (\text{or } b) < y_\beta \text{ and } d (\text{or } e) \geq y_\beta \qquad (2)$$

In the process of step S27, the calculation expression of adding the cumulative value of the same column of the lowermost row in the upper region (the upper object recognition region in this embodiment) to the cumulative value of the lower region (the ground-contact object recognition region in this embodiment) is expressed, for example, by Equation (3).

Here, ii−L($x_n$, $y_n$) represents the cumulative value at a point ($x_n$, $y_n$) of an arbitrary row and an arbitrary column in the lower region.

ii-U($x_n$, $y_{N1-1}$) represents the cumulative value at a point ($x_n$, $y_{N1-1}$) of the lowermost row and the arbitrary column in the upper region. (N1-1) represents the lowermost row of the upper region.

ii-ADD($x_n$, $y_n$) represents the resultant cumulative value.

$$ii\text{-}ADD(x_n,y_n)=ii\text{-}L(x_n,y_n)+ii\text{-}U(x_n,y_{N1-1}) \tag{3}$$

As described above, when creating an integral histogram (or an integral image) of a specific region from an acquired image, the object recognition unit 13 of the camera ECU 1 in the image processing system according to this embodiment divides the vertical region of the image into multiple sub-regions and calculates independent cumulative values thereof. When calculating the cumulative value of a rectangular range (rectangular region) extending over the vertically-divided sub-regions, the object recognition unit 13 according to this embodiment calculates the cumulative value of a point in each lower sub-region by adding the cumulative value in each upper sub-regions of the point in the same column located in the lowermost row of each upper sub-region (for example, each sub-region over which the rectangular range extends or all sub-regions present as another configuration example) to the cumulative value in the lower sub-region of the point in the lower region.

When creating an integral histogram (or an integral image) of a specific region from an acquired image, the object recognition unit 13 according to this embodiment divides the vertical region of the image into multiple sub-regions and calculates the independent cumulative values thereof. Then, the object recognition unit 13 according to this embodiment uses the cumulative values in the sub-regions (divided regions) when calculating the cumulative value of the rectangular range (rectangular region) not extending over the vertically-divided sub-regions.

The object recognition unit 13 according to this embodiment calculates the cumulative value with respect to the position of a reference point common to the sub-regions as the independent cumulative value in each sub-region.

As described above, by employing the object recognition unit 13 of the camera ECU 1 in the image processing system according to this embodiment, it is possible to efficiently acquire a cumulative value of a predetermined range (region).

That is, in the object recognition unit 13 according to this embodiment, it is possible to limit the data length using a cumulative value (for example, a cumulative value of a gradient magnitude for each gradient direction) without losing the volume of information by dividing the region of an integral histogram (or an integral image) and to simply calculate a cumulative value of a rectangular region to calculate a feature value.

For example, in this embodiment, by using the cumulative value limiting the data length, it is possible to realize small capacity of the memory 23 and to improve efficiency of transmission of data to the memory 23 or access of a CPU to the memory, thereby efficiently calculating a feature value. In this embodiment, in an integration method of using a common integral histogram (or an integral image) as data of pattern recognition of each target object, processes of recognizing multiple types of target object at a time, such as a road traffic sign, in addition to a vehicle, a motorcycle, a bicycle, and a pedestrian can be performed by a single device (for example, the camera ECU 1 according to this embodiment).

According to this embodiment, a device and a method suitable for recognizing a target object and a computer program used for the device or method can be provided.

(Description of Related Art)

The related art of this embodiment will be described with reference to FIGS. 16 to 19.

An example where a gradient direction and a gradient magnitude are calculated will be described with reference to Part (A) of FIG. 16 to Part (D) of FIG. 16.

Part (A) of FIG. 16 is a diagram illustrating an example of an intensity image.

In this example, the pixel position in the x axis in the transverse (horizontal) direction is defined as u, and the coordinate value increases toward the right side. The pixel position in the y axis in the longitudinal (vertical) direction is defined as v, and the coordinate value increases toward the below.

The pixel position in the plane of x-y orthogonal coordinates is defined as a coordinate (u, v).

Part (B) of FIG. 16 shows an expression illustrating an example of a gradient.

In this example, the intensity at the pixel position of a coordinate (u, v) is defined as I(u, v).

The gradient of intensity in the transverse (horizontal) direction at the pixel position of a coordinate (u, v) is defined as Ix, and Ix is expressed by Equation (4). The gradient of intensity in the longitudinal (vertical) direction at the pixel position of a coordinate (u, v) is defined as Iy, and Iy is expressed by Equation (5).

$$Ix = I(u+1,v) - I(u-1,v) \tag{4}$$

$$Iy = I(u,v+1) - I(u,v-1) \tag{5}$$

Part (C) of FIG. 16 shows an expression illustrating an example of a gradient magnitude.

In this example, the gradient magnitude at the pixel position of a coordinate (u, v) is defined as m(u, v), and m(u, v) is expressed by Equation (6).

Part (D) of FIG. 16 shows an expression illustrating an example of a gradient direction.

In this example, the gradient direction at the pixel position of a coordinate (u, v) is defined as θ(u, v), and θ(u, v) is expressed by Equation (7).

$$m(u, v) = \sqrt{Ix^2 + Iy^2} \tag{6}$$

$$\theta(u, v) = \tan^{-1}\left(\frac{Iy}{Ix}\right) \tag{7}$$

Here, the gradient of intensity in an image corresponds to a differential image.

For example, linkage of pixel positions at which the gradient of intensity is larger than a predetermined threshold value can be detected as a gradient.

Other techniques such as a technique using a Sobel filter may be used as the technique of calculating a gradient.

The integral gradient image is often used, for example, to calculate the HOG feature value.

The HOG feature value will be described below with reference to Part (A) of FIG. 17 and Part (B) of FIG. 17.

Part (A) of FIG. 17 shows an example of conversion into a histogram using cells.

Cells 2001 and a block 2002 including nine cells in total of 3×3, which are set in an image, are shown.

In this example, each cell includes five pixels (5 pixels) in the transverse (horizontal) direction and five pixels (5 pixels) in the longitudinal direction (vertical direction).

An intensity gradient distribution 2003 in the unit of cells is shown for each cell 2001. In this regard, a gradient direction histogram in which the horizontal axis represents the direction and the vertical axis represents the gradient magnitude is shown with nine directions as examples.

In this example, the intensity gradients in the cells in the region are normalized in the unit of block 2002.

Part (B) of FIG. 17 shows an example where the HOG feature value normalized by the block region is calculated.

With nine directions as examples, a feature vector $F_{j,k}$ of a single cell 2011 is expressed by Equation (8). The components f of the feature vector in the directions (direction 1 to direction 9) are defined as $f_1$ to $f_9$, respectively. Here, k represents the position in the transverse (horizontal) direction of a cell and j represents the position in the longitudinal (vertical) direction.

The feature vector V of the block 2012 is expressed by Equation (9).

The normalization result v using the magnitude of the feature vector V is expressed by Equation (10).

In this example, the HOG feature vector has 9 cells×9 dimensions×4 blocks=324 dimensions.

$$F_{j,k} = [f_1, f_2, f_3, f_4, f_5, f_6, f_7, f_8, f_9] \quad (8)$$

$$V = [F_{j,k}, F_{j,k+1}, F_{j,k+2}, F_{j+1,k}, F_{j+1,k+1}, F_{j+1,k+2}, F_{j+2,k}, F_{j+2,k+1}, F_{j+2,k+2}] \quad (9)$$

$$v = \frac{f}{\sqrt{\|V\|^2 + \varepsilon^2}} \quad (\varepsilon = 1) \quad (10)$$

An integral image will be described below with reference to Part (A), Part (B), and Part (C) of FIG. 18.

Part (A) of FIG. 18 is a diagram illustrating an example of an original image.

In this example, an intensity image 2101 is shown as the original image.

In the intensity image 2101, an intensity value at a pixel position (x, y) is defined as i(x, y), where the transverse (horizontal) direction is defined as the x axis and the longitudinal (vertical) direction is defined as the y axis.

Part (B) of FIG. 18 is a diagram illustrating a result of a cumulative row addition.

In this example, integration is repeatedly performed from the left-top to the right-bottom of a frame.

In the cumulative row addition result 2102, a cumulative row addition value s(x, y) of a pixel position (x, y) is expressed by Equation (11).

$$s(x,y)=s(x,y-1)+i(x,y) \quad (11)$$

Part (C) of FIG. 18 is a diagram illustrating an example of an integral image.

In this example, integration is repeatedly performed from the left-top to the right-bottom in a frame.

In the integral image 2103, an integral value ii(x, y) of a pixel position (x, y) is expressed by Equation (12).

$$ii(x,y)=ii(x-1,y)+s(x,y) \quad (12)$$

The Haar-like feature value will be described below with reference to Part (A) and Part (B) of FIG. 19.

Part (A) of FIG. 19 shows a two-rectangle feature 2201.

A difference between left and right rectangular feature values is used as the two-rectangle feature 2201.

Part (B) of FIG. 19 shows a method of calculating the two-rectangle feature. In this example, the integrated value of a partial region is calculated from the integral image.

Here, a, b, c, d, e, and f are defined as integral gradient values at the points.

The single-rectangle feature value of the right region (region (1)) is expressed by Expression (13) and can be calculated at four points.

The single-rectangle feature value of the left region (region (2)) is expressed by Expression (14) and can be calculated at four points.

The two-rectangle feature value which is the difference between the feature value of region (1) and the feature value of region (2) is expressed by Equation (15) and can be calculated at six points.

$$f+b-(c+e) \quad (13)$$

$$e+a-(b+d) \quad (14)$$

$$e+a-(b+d)-(f+b-(c+e))=a+2e+c-2b-f-d \quad (15)$$

Regarding the integration, the integration is repeatedly performed, for example, from the left-top side of the image to the right-bottom side.

In this way, the rectangular region of the integral image is used as a rectangle of the Haar-like feature value.

An integral histogram (gradient integral histogram) is known as an application of the integral image.

Specifically, integration is performed on the gradient image for each gradient direction.

Accordingly, a histogram in the unit of cells can be easily created.

The rectangular region of the integral histogram is used, for example, as a cell of an HOG feature value.

(Second Embodiment)

An image processing system according to this embodiment is roughly the same configuration as shown in FIG. 1. Accordingly, this embodiment will be described using the same reference numerals as shown in FIG. 1.

Points different from the first embodiment will be mainly described in this embodiment, and the same points as described in the first embodiment will not be described in detail.

Processes performed by the object recognition unit 13 according to this embodiment will be described below.

An integral histogram will be described below as an example, but an integral image may be used in another configuration example.

Figure 8:
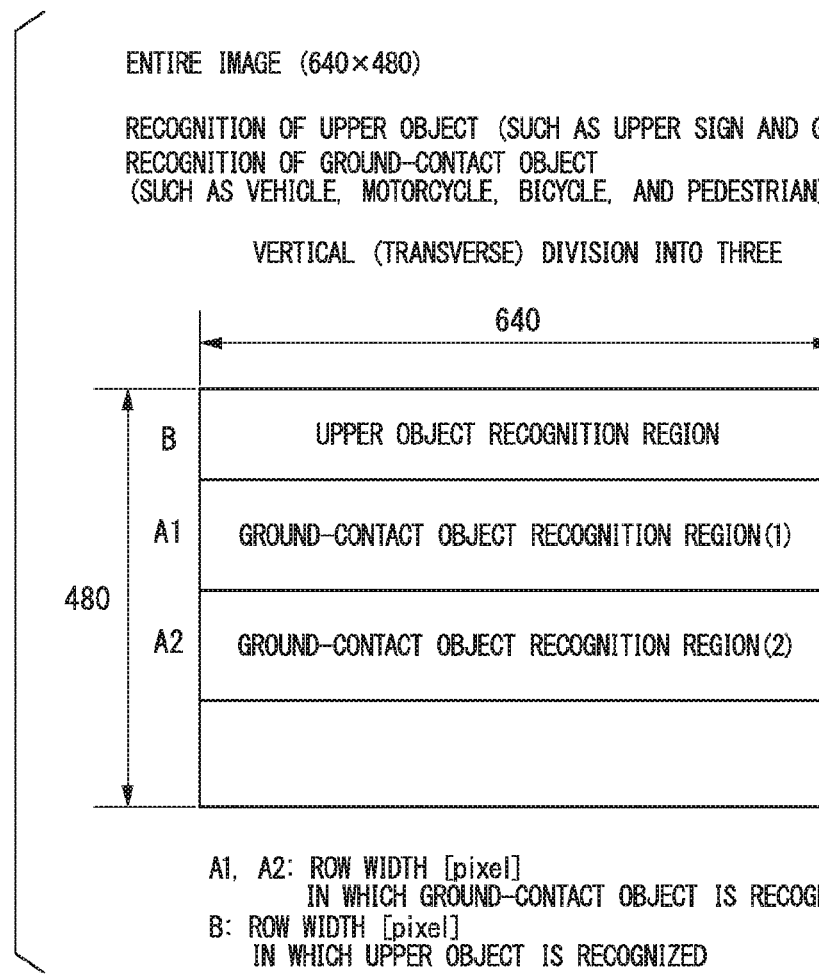
FIG. 8 is a diagram illustrating an example of integral histogram sub-regions according to a second embodiment of the present invention.

FIG. 8 is a diagram illustrating an example of integral histogram sub-regions according to this embodiment.

In this embodiment, it is assumed that an image (entire image) captured by the camera 11 is an image of 640 pixels in the horizontal direction×480 pixels in the vertical direction.

In this embodiment, a used region in the entire image is vertically (transversely) divided into three regions which are a ground-contact object recognition region (2) on the lowermost side, a ground-contact object recognition region (1) in the middle, and an upper object recognition region on the uppermost side. Regarding the upper object recognition region and the ground-contact object recognition region (the ground-contact object recognition region (1) and the ground-contact object recognition region (2)), the upper object recognition region is located on the upper side and the ground-contact recognition region is located on the lower side. In this embodiment, the region below the ground-contact object recognition region (the ground-contact object recognition region (1) and the ground-contact object recognition region (2)) is a nonuse region.

Here, in the integral histogram sub-regions according to this embodiment shown in FIG. 8, the ground-contact object recognition region is further divided into two sub-regions (the ground-contact object recognition region (1) and the ground-contact object recognition region (2)), compared with the integral histogram sub-regions according to the first embodiment shown in FIG. 2.

In this way, by increasing the number of sub-regions, the size of the individual sub-regions decreases and it is thus possible to further enhance a rate of reduction of an added data length.

The ground-contact object recognition region (1) is a region for mainly detecting objects (ground-contact objects) contacting the ground and being present in a region having possibility of collision with the vehicle, such as a vehicle, a motorcycle, a bicycle, and a pedestrian. The ground-contact object recognition region is a section of rows of which the maximum row width in which a ground-contact object can be recognized is A1 (pixel).

The ground-contact object recognition region (2) is a region for detecting objects (ground-contact objects) contacting the ground and being present in a region having possibility of collision with the vehicle, such as a vehicle, a motorcycle, a bicycle, and a pedestrian. The ground-contact object recognition region is a section of rows of which the maximum row width is A2 (pixel).

The upper object recognition region is a region for mainly detecting objects (upper objects) such as a road traffic sign (including a guidance sign). The upper object recognition region is a section of rows of which the additional row width capable of recognizing the upper objects is B (pixel).

The nonuse region is a section of rows of which the nonuse row width is (480-A1-A2-B) (pixel).

For example, the method of dividing the entire image region is set in advance and is stored in the memory 23 or the like. Specifically, information for specifying a region serving as the upper object recognition region in the entire image region, information for specifying a region serving as the ground-contact object recognition region (1), information for specifying a region serving as the ground-contact object recognition region (2), or information for specifying a region serving as the nonuse region is stored in the memory 23 or the like.

In another configuration example, the method of dividing the entire image region may be adaptively set depending on the behavior of the vehicle or the captured image or may be set in accordance with an instruction input from a user.

Here, the summed region of the sub-regions such as the upper object recognition region and the ground-contact object recognition region (the ground-contact object recognition region (1) and the ground-contact object recognition region (2)) may be, for example, the entire image region or a part of the entire image region. The nonuse region may be provided or may not be provided.

Figure 9:
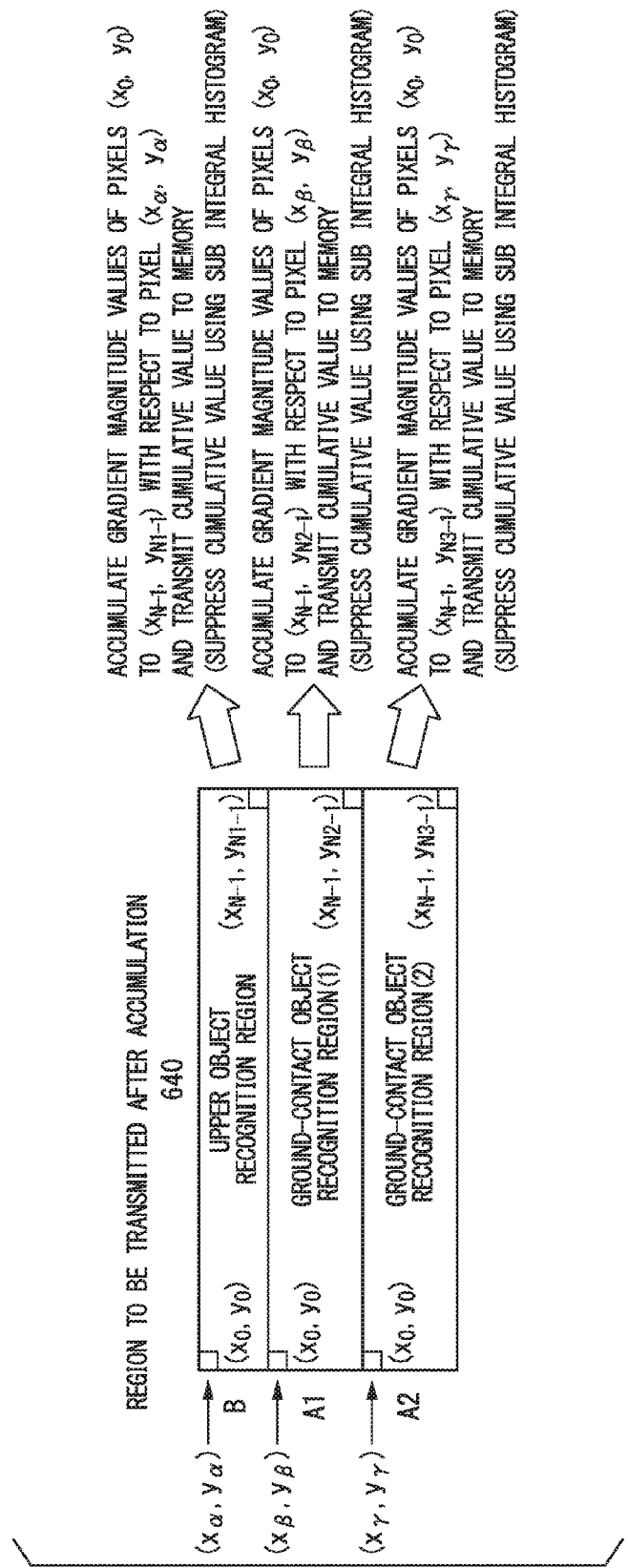
FIG. 9 is a diagram illustrating details of integral histogram sub-regions according to the second embodiment of the present invention.

FIG. 9 is a diagram illustrating details of the integral histogram sub-regions according to this embodiment.

In this embodiment, regarding a pixel constituting an image, the pixel position (coordinate value) in the horizontal direction is expressed by x (pixel) and the pixel position (coordinate value) in the vertical direction is expressed by y (pixel).

In this embodiment, the left-top pixel position of an image is defined as an origin (0, 0), the value of x increases toward the right side in the horizontal direction, and the value of y increases toward the lower side in the vertical direction.

The addition expression is expressed by Expression (1).

Here, $i(x, y)$ represents the value to be added at a pixel position $(x, y)$. A value of a gradient magnitude is used as the value to be added in this embodiment, but other values may be used.

$ii(x_n, y_n)$ represents the cumulative value.

$(x_0, y_0)$ represents the origin (pixel position) for calculating the cumulative value.

$(x_n, y_n)$ represents an arbitrary point (pixel position).

In $(x_{N-1}, y_{N1-1})$, (N-1) is 639 and (N1-1) is a value indicating the lowermost row in the upper object recognition region.

In $(x_{N-1}, y_{N2-1})$, (N-1) is 639 and (N2-1) is a value indicating the lowermost row in the ground-contact object recognition region (1).

In $(x_{N-1}, y_{N3-1})$, (N-1) is 639 and (N3-1) is a value indicating the lowermost row in the ground-contact object recognition region (2).

In this embodiment, the upper object recognition region has a rectangular shape, the left-top pixel position thereof is defined as $(x_\alpha, y_\alpha)$, and the right-bottom pixel position thereof is defined as $(x_{N-1}, y_{N1-1})$.

In the upper object recognition region, the object recognition unit 13 adds the gradient magnitude values $i(x, y)$ from $(x_0, y_0)=(x_\alpha, y_\alpha)$ to $(x_n, y_n)=(x_{N-1}, y_{N1-1})$ with the pixel position $(x_\alpha, y_\alpha)$ as a reference point and transmits the cumulative value $ii(x_n, y_n)$ to the memory 23.

Here, $(x_{N-1}, y_{N1-1})$ represents the pixel position of an intersection between the 639-th (=N-1) column and the (N1-1)-th row in the B section.

$y_\alpha$ represents the upper limit pixel position (pixel) for recognizing an upper object.

The cumulative value can be suppressed by using such integral histogram sub-regions.

In this embodiment, the ground-contact object recognition region (1) has a rectangular shape, the left-top pixel position thereof is defined as $(x_\beta, y_\beta)$, and the right-bottom pixel position thereof is defined as $(x_{N-1}, y_{N2-1})$.

In the ground-contact object recognition region (1), the object recognition unit 13 adds the gradient magnitude values $i(x, y)$ from $(x_0, y_0)=(x_\beta, y_\beta)$ to $(x_n, y_n)=(x_{N-1}, y_{N2-1})$ with the pixel position $(x_\beta, y_\beta)$ as a reference point and transmits the cumulative value $ii(x_n, y_n)$ to the memory 23.

Here, $(x_{N1-1}, y_{N2-1})$ represents the pixel position of an intersection between the 639-th (=N-1) column and the (N2-1)-th row in the A1 section.

$y_\beta$ represents the upper limit pixel position (pixel) for recognizing a ground-contact object using the ground-contact recognition region (1).

The cumulative value can be suppressed by using such integral histogram sub-regions.

In this embodiment, the ground-contact object recognition region (2) has a rectangular shape, the left-top pixel position thereof is defined as $(x_\gamma, y_\gamma)$, and the right-bottom pixel position thereof is defined as $(x_{N-1}, y_{N3-1})$.

In the ground-contact object recognition region (2), the object recognition unit 13 adds the gradient magnitude values $i(x, y)$ from $(x_0, y_0)=(x_\gamma, y_\gamma)$ to $(x_n, y_n)=(x_{N-1}, y_{N3-1})$ with the pixel position $(x_\gamma, y_\gamma)$ as a reference point and transmits the cumulative value $ii(x_n, y_n)$ to the memory 23.

Here, $(x_{N-1}, y_{N3-1})$ represents the pixel position of an intersection between the 639-th (=N-1) column and the (N3-1)-th row in the A2 section.

$y_\gamma$ represents the upper limit pixel position (pixel) for recognizing a ground-contact object using the ground-contact recognition region (2).

The cumulative value can be suppressed by using such integral histogram sub-regions.

Figure 10:
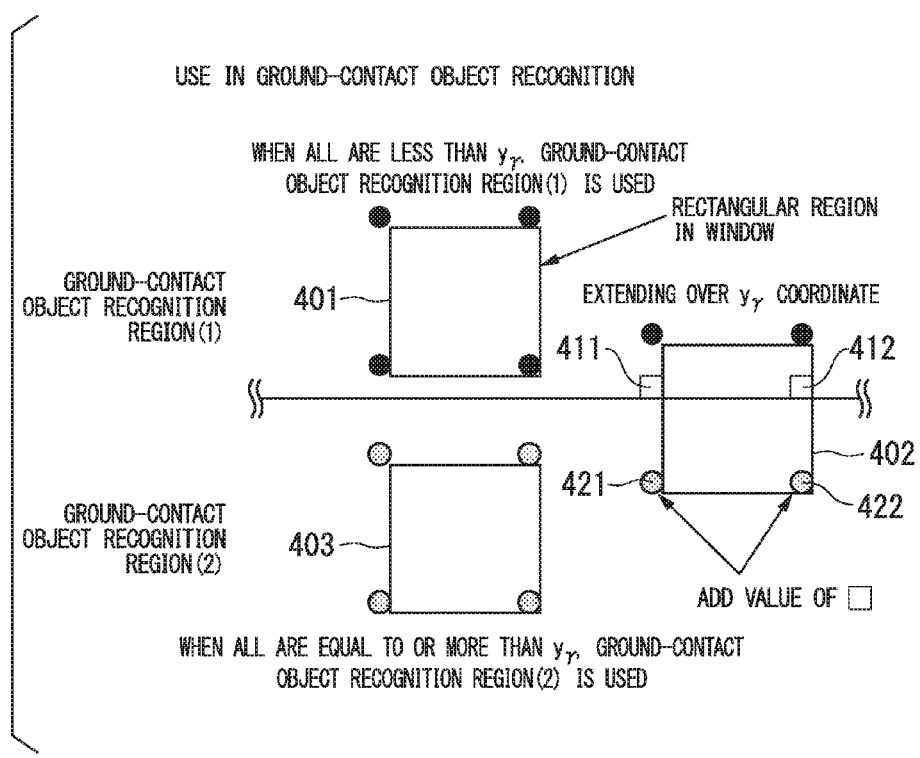
FIG. 10 is a diagram illustrating an example where a rectangular region in a window extends over sub-regions and an example where the rectangular region does not extend over sub-regions.

FIG. 10 is a diagram illustrating an example where a rectangular region in a window extends over sub-regions and an example where the rectangular region does not extend over sub-regions regarding an object on the ground.

In the ground-contact object recognition region (the ground-contact object recognition region (1) and the ground-contact object recognition region (2)), when the rectangular region does not extend over the sub-regions and the values of y at all the pixel positions is smaller than $y_\gamma$ like rectangular region 401 in the window, the ground-contact object recognition region (I) is used.

In the ground-contact object recognition region (the ground-contact object recognition region (1) and the ground-contact object recognition region (2)), when the rectangular region does not extend over the sub-regions and the values of y at all the pixel positions is equal to or more than $y_\gamma$ like rectangular region 403 in the window, the ground-contact object recognition region (2) is used.

In the ground-contact object recognition region (the ground-contact object recognition region (1) and the ground-contact object recognition region (2)), when the rectangular region extends over the sub-regions and a portion in which the value of y at a pixel position is smaller than $y_\gamma$ and a portion in which the value of y at a pixel position is equal to or more than $y_\gamma$ are present like rectangular region 402 in the window, the gradient magnitude cumulative value of two points 411 and 412 in the same column in the lowermost row of the upper object recognition region (1) on the upper side is added to the gradient magnitude cumulative value of two points 421 and 422 in the ground-contact object recognition region (2) on the lower side. Accordingly, the same cumulative value as the cumulative value when the region is not divided is obtained.

When the rectangular region in the window extends over and does not extend over the upper object recognition region and the ground-contact object recognition region (1), the same as described with reference to FIG. 4 in the first embodiment is true.

Figure 11:
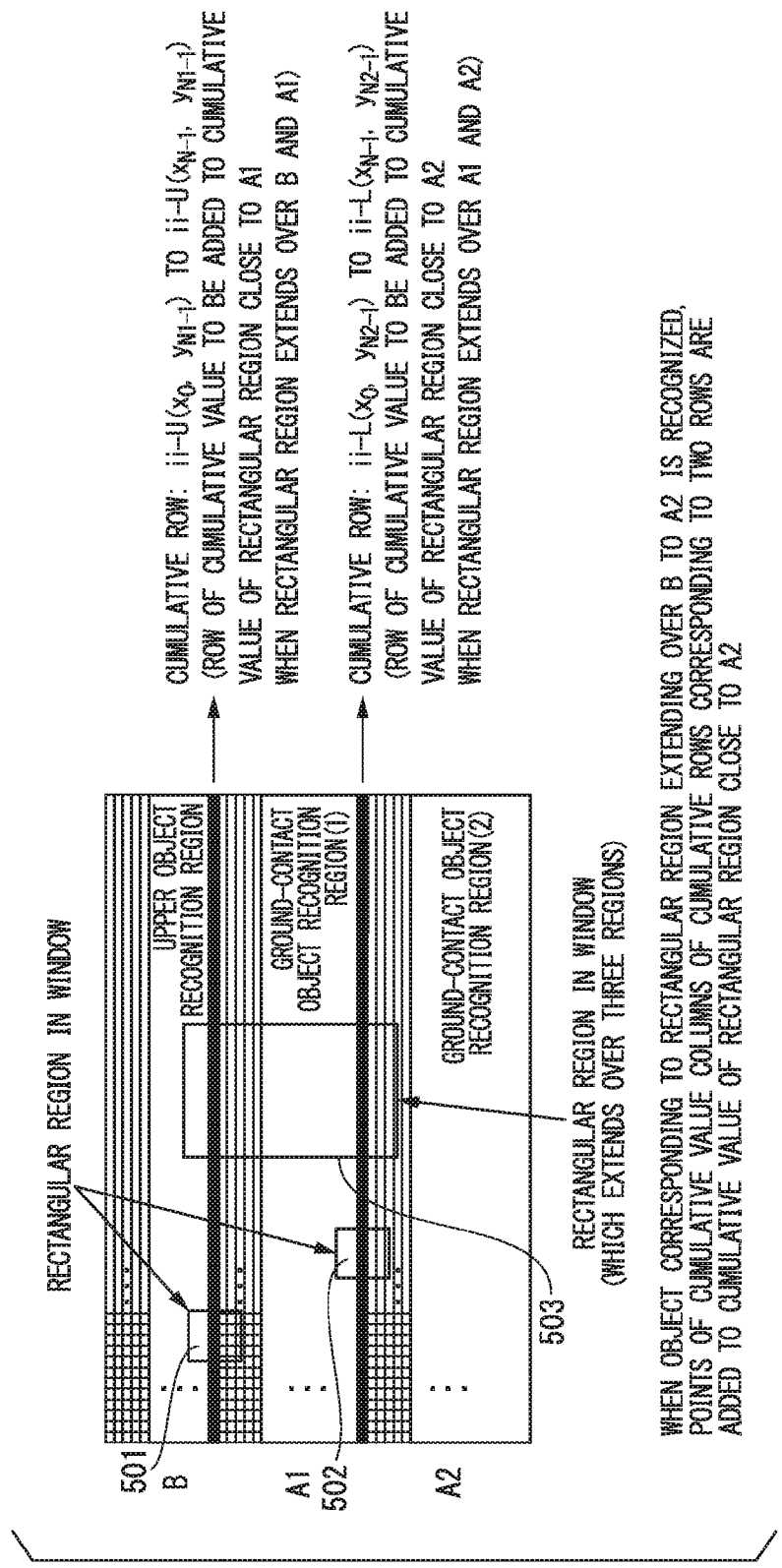
FIG. 11 is a diagram illustrating an example of row addition in integral histogram sub-regions.

FIG. 11 is a diagram illustrating an example of row addition in integral histogram sub-regions.

A rectangular region 501 in a window extends over the upper object recognition region and the ground-contact object recognition region (1).

In this case, in the rectangular region 501 in the window, the row of the cumulative value to be added to the cumulative value of the rectangular region close to the ground-contact recognition region (1) is the lowermost row in the upper object recognition region and the cumulative value thereof is ii–U($x_0, y_{N1-1}$) to ii–U($x_{N-1}, y_{N-1}$).

In the rectangular region 501 in the window, the column of the cumulative value to be added to the cumulative value of the rectangular region close to the ground-contact recognition region (1) is the same column.

In this example, ii–U($x_n, y_n$) represents the cumulative value in the upper object recognition region.

A rectangular region 502 in a window extends over the ground-contact object recognition region (1) and the ground-contact object recognition region (2).

In this case, in the rectangular region 502 in the window, the row of the cumulative value to be added to the cumulative value of the rectangular region close to the ground-contact recognition region (2) is the lowermost row in the ground-contact object recognition region (1) and the cumulative value thereof is ii–L($x_0, y_{N2-1}$) to ii–L($x_{N-1}, y_{N2-1}$). In the rectangular region 502 in the window, the column of the cumulative value to be added to the cumulative value of the rectangular region close to the ground-contact recognition region (2) is the same column.

In this example, ii–L($x_n, y_n$) represents the cumulative value in the ground-contact object recognition region (1).

A rectangular region 503 in the window extends over three regions (the upper object recognition region, the ground-contact object recognition region (1), and the ground-contact object recognition region (2)).

In this case, the same cumulative value as when the rectangular region extends over the upper object recognition region and the ground-contact object recognition region (1) and the same cumulative value as when the rectangular region extends over the ground-contact object recognition region (1) and the ground-contact object recognition region (2) are both added to the cumulative value of the rectangular region close to the ground-contact object recognition region (2) on the lowermost side. That is, the cumulative value of two rows in total is added thereto. In the rectangular region 503 in the window, the columns of the cumulative value of two rows in total added to the cumulative value of the rectangular region close to the ground-contact object recognition region (2) are the same column.

In this way, when such an object that the rectangular region 503 in the window extends over three regions is recognized, the integrated value of the points of the columns corresponding to two rows in total is added to the cumulative value of the rectangular region close to the ground-contact object recognition region (2).

In the configuration according to this embodiment, for example, even when the rectangular region has any size, the complexity of the addition expression does not increase and it is thus possible to simplify the processes.

Figure 12:
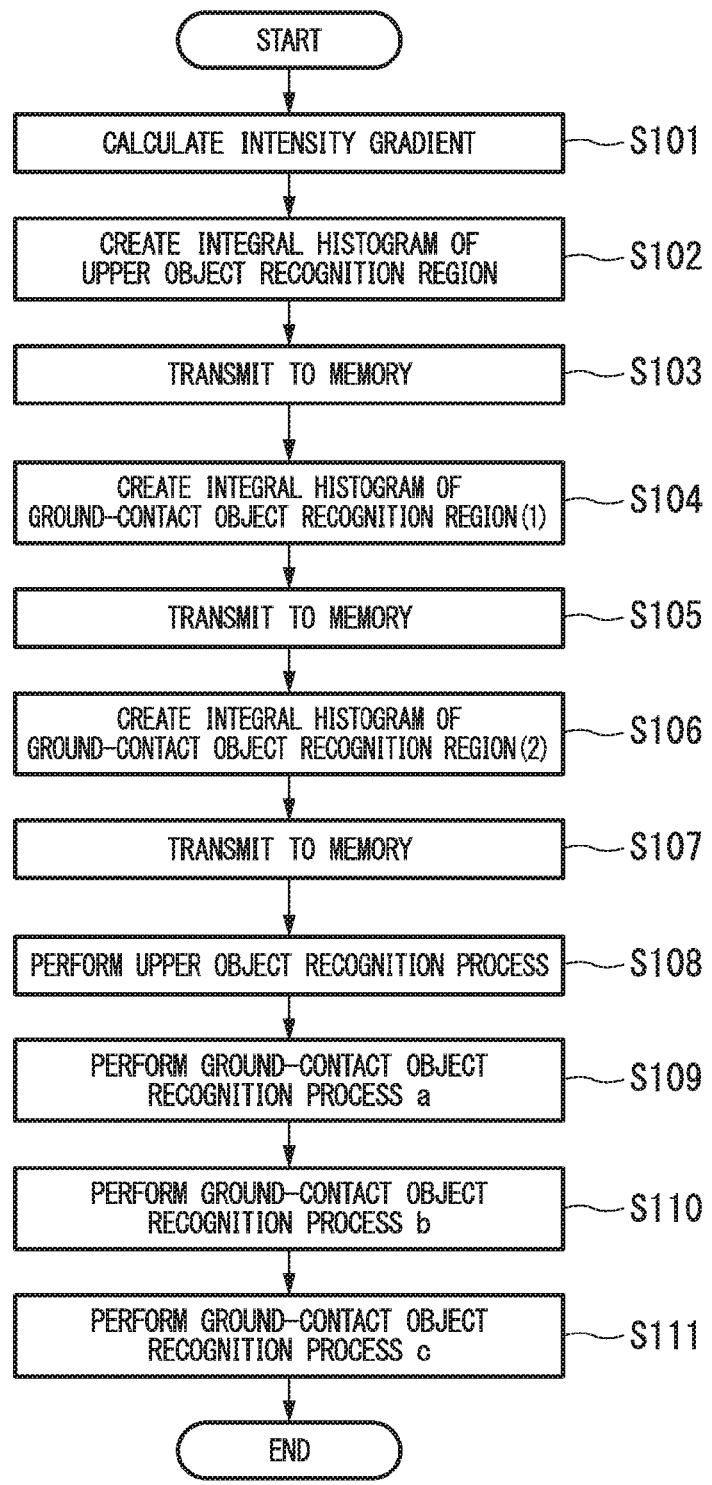
FIG. 12 is a flowchart illustrating an example of a process flow which is performed by an object recognition unit according to the second embodiment of the present invention.

FIG. 12 is a flowchart illustrating an example of a process flow which is performed by the object recognition unit 13 according to this embodiment.

Here, the flowchart shown in FIG. 12 is on the premise that an integral histogram is vertically (transversely) divided into three sub-regions as shown in FIG. 8, additionally includes creation of sub integral histograms and transmission to the memory (steps S102 to S107) in comparison with the flowchart according to the background art shown in FIG. 20, and causes the additional steps to correspond to four types of object recognition (steps S108 to S111).

First, the object recognition unit 13 calculates a gradient of intensity in an image to be processed (from which a target object will be recognized in this embodiment) (step S101).

Then, the object recognition unit 13 creates an integral histogram of the upper object recognition region (step S102).

The process of creating the integral histogram is performed, for example, by any one or more of the FPGA 21 (or the DSP) and the microcomputer 22.

Then, the object recognition unit 13 transmits data of the created integral histogram of the upper object recognition region to the memory 23 (step S103).

Subsequently, the object recognition unit 13 creates an integral histogram of the ground-contact object recognition region (1) (step S104).

Then, the object recognition unit 13 transmits the created integral histogram of the ground-contact object recognition region (1) to the memory 23 (step S105).

Subsequently, the object recognition unit 13 creates an integral histogram of the ground-contact object recognition region (2) (step S106).

Then, the object recognition unit 13 transmits the created integral histogram of the ground-contact object recognition region (2) to the memory 23 (step S107).

The processes of steps S102 to S107 are shown in FIG. 9.

Then, the object recognition unit 13 performs an object recognition process (a pattern recognition process for object recognition in this embodiment) with the data of the integral histogram stored in the memory 23 as input data (steps S108 to S111).

Specifically, the object recognition unit 13 performs an upper object recognition process (step S108), performs a ground-contact object recognition process a (step S109), performs a ground-contact object recognition process b (step S110), and performs a ground-contact object recognition process c (step S1).

In the upper object recognition process, a process of mainly recognizing an object present on the upper side (for example, a region above the vehicle) of the image is performed.

In the ground-contact object recognition process, a process of mainly recognizing an object present on the lower side (for example, a region having possibility of collision with the vehicle) of the image in comparison with the upper side of the image is performed.

The ground-contact object recognition process a, the ground-contact object recognition process b, and the ground-contact object recognition process c are processes of recognizing different ground-contact objects. Examples of the different ground-contact objects include a vehicle, a motorcycle, a bicycle, and a pedestrian.

The ground-contact object recognition processes (the ground-contact object recognition process a, the ground-contact object recognition process b, and the ground-contact object recognition process c in this embodiment) may be performed, for example, on one or more of multiple ground-contact object recognition regions (the ground-contact object recognition region (1) and the ground-contact object recognition region (2) in this embodiment) or on all thereof.

For example, the same configuration or operation as described with reference to FIG. 6 (and FIG. 21) in the first embodiment can be used as details of the object recognition process.

In this embodiment, as described with reference to FIG. 11, in the process of step S27 in the flowchart shown in FIG. 6, the corresponding cumulative value adding processes are performed on the case where the rectangular region in the window extends over two sub-regions and on the case when the rectangular region extends over three sub-regions, respectively.

As described above, when creating an integral histogram (or an integral image) of a specific region from an acquired image, the object recognition unit 13 of the camera ECU 1 in the image processing system according to this embodiment divides the vertical region of the image into multiple sub-regions and calculates independent cumulative values thereof. When calculating the cumulative value of a rectangular range (rectangular region) extending over the vertically-divided sub-regions, the object recognition unit 13 according to this embodiment calculates the cumulative value of a point in each lower sub-region by adding the cumulative value in each upper sub-regions of the point in the same column located in the lowermost row of each upper sub-region (for example, each sub-region over which the rectangular range extends or all sub-regions present as another configuration example) to the cumulative value in the lower sub-region of the point in the lower region.

When creating an integral histogram (or an integral image) of a specific region from an acquired image, the object recognition unit 13 according to this embodiment divides the vertical region of the image into multiple sub-regions and calculates the independent cumulative values thereof. Then, the object recognition unit 13 according to this embodiment uses the cumulative values in the sub-regions (divided regions) when calculating the cumulative value of the rectangular range (rectangular region) not extending over the vertically-divided sub-regions.

The object recognition unit 13 according to this embodiment calculates the cumulative value with respect to the position of a reference point common to the sub-regions as the independent cumulative value in each sub-region.

As described above, by employing the object recognition unit 13 of the camera ECU 1 in the image processing system according to this embodiment, it is possible to efficiently acquire a cumulative value of a predetermined range (region).

That is, in the object recognition unit 13 according to this embodiment, it is possible to limit the data length using a cumulative value (for example, which may be an addition frequency for each gradient direction in addition to a cumulative value of a gradient magnitude for each gradient direction) without losing the volume of information by dividing the region of an integral histogram (or an integral image) and to simply calculate a cumulative value of a rectangular region to calculate a feature value.

For example, in this embodiment, by using the cumulative value limiting the data length, it is possible to realize small capacity of the memory 23 and to improve efficiency of transmission of data to the memory 23 or access of a CPU to the memory, thereby efficiently calculating a feature value. In this embodiment, in an integration method of using a common integral histogram (or an integral image) as data of pattern recognition of each target object, processes of recognizing multiple types of target object at a time, such as a road traffic sign, in addition to a vehicle, a motorcycle, a bicycle, and a pedestrian can be performed by a single device (for example, the camera ECU 1 according to this embodiment).

According to this embodiment, a device and a method suitable for recognizing a target object and a computer program used for the device or method can be provided.

(Third Embodiment)

An image processing system according to this embodiment is roughly the same configuration as shown in FIG. 1. Accordingly, this embodiment will be described using the same reference numerals as shown in FIG. 1.

Points different from the first embodiment will be mainly described in this embodiment, and the same points as described in the first embodiment will not be described in detail.

Processes performed by the object recognition unit 13 according to this embodiment will be described below.

An integral histogram will be described below as an example, but an integral image may be used in another configuration example.

Figure 13:
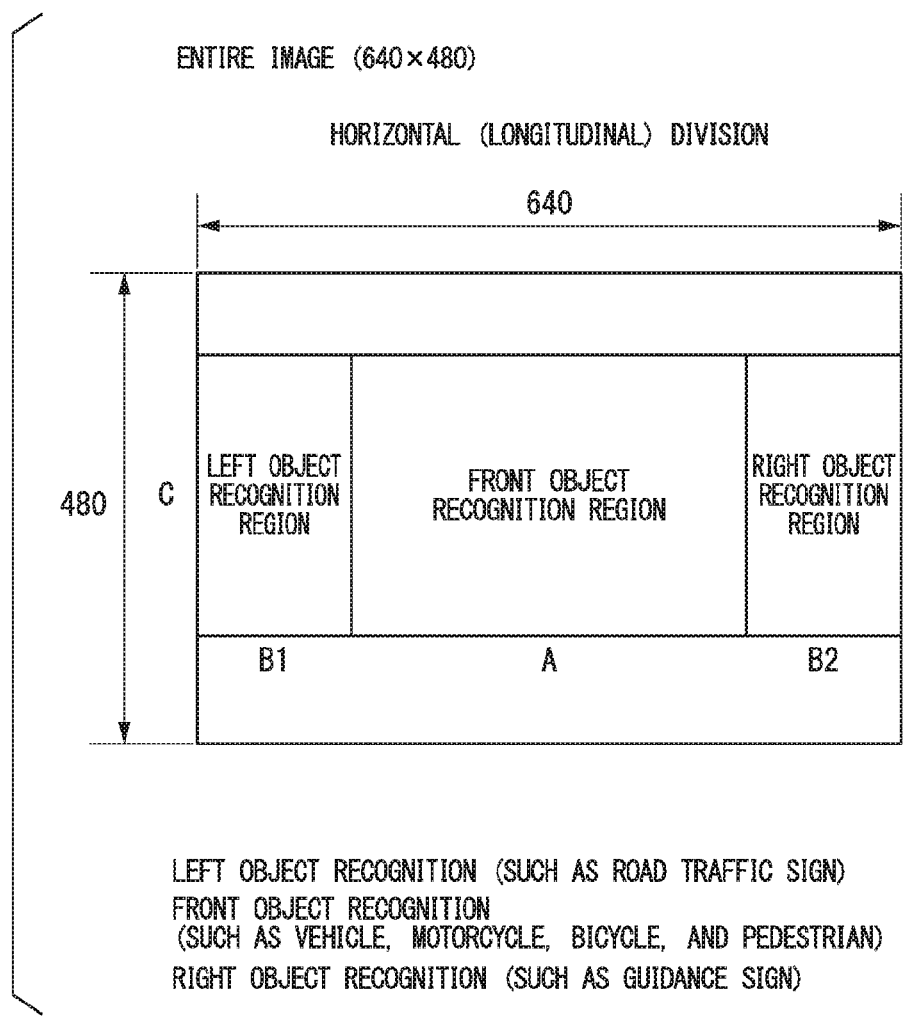
FIG. 13 is a diagram illustrating an example of integral histogram sub-regions according to a third embodiment of the present invention.

FIG. 13 is a diagram illustrating an example of integral histogram sub-regions according to this embodiment.

In this embodiment, it is assumed that an image (entire image) captured by the camera 11 is an image of 640 pixels in the horizontal direction×480 pixels in the vertical direction.

In this embodiment, a used region in the entire image is horizontally (longitudinally) divided into three regions which are a left object recognition region on the leftmost side, a front object recognition region in the middle, and a right object recognition region on the rightmost side. In this embodiment, the positions (the position on the upper side and the position on the lower side) in the longitudinal direction of these three object recognition regions (the left object recognition region, the front object recognition region, and the right object recognition region) are the same and a region below and above these regions is a nonuse region.

Here, in the integral histogram sub-regions according to this embodiment shown in FIG. 13, the direction in which the integral histogram is divided is set to the horizontal direction instead of the vertical direction and the number of sub-regions is set to three instead of two, compared with the integral histogram sub-regions according to the first embodiment shown in FIG. 2.

The left object recognition region is a region for mainly detecting an object (for example, a ground-contact object) such as a road traffic sign present on the left side. The column width of the left object recognition region is a section of columns of B1 (pixel).

The front object recognition region is a region for mainly detecting an object (a ground-contact object) which contacts the ground and which is able to collide with the vehicle, such as a vehicle, a motorcycle, a bicycle, and a pedestrian. The column width of the front object recognition region is a section of columns of A (pixel).

The right object recognition region is a region for mainly detecting an object (for example, a ground-contact object) such as a guidance sign present on the right side. The column width of the right object recognition region is a section of columns of B2 (pixel).

The upper and lower nonuse regions are sections of columns with the total column width of (480-C) (pixel).

For example, the method of dividing the entire image region is set in advance and is stored in the memory 23 or the like. Specifically, information for specifying a region serving as the left object recognition region in the entire image region, information for specifying a region serving as the front object recognition region, information for specifying a region serving as the right object recognition region, or information for specifying a region serving as the nonuse region is stored in the memory 23 or the like.

In another configuration example, the method of dividing the entire image region may be adaptively set depending on the behavior of the vehicle or the captured image or may be set in accordance with an instruction input from a user.

Here, the summed region of the sub-regions such as the left object recognition region, the front object recognition region, and the right object recognition region may be, for example, the entire image region or a part of the entire image region. The nonuse region may be provided or may not be provided.

Figure 14:
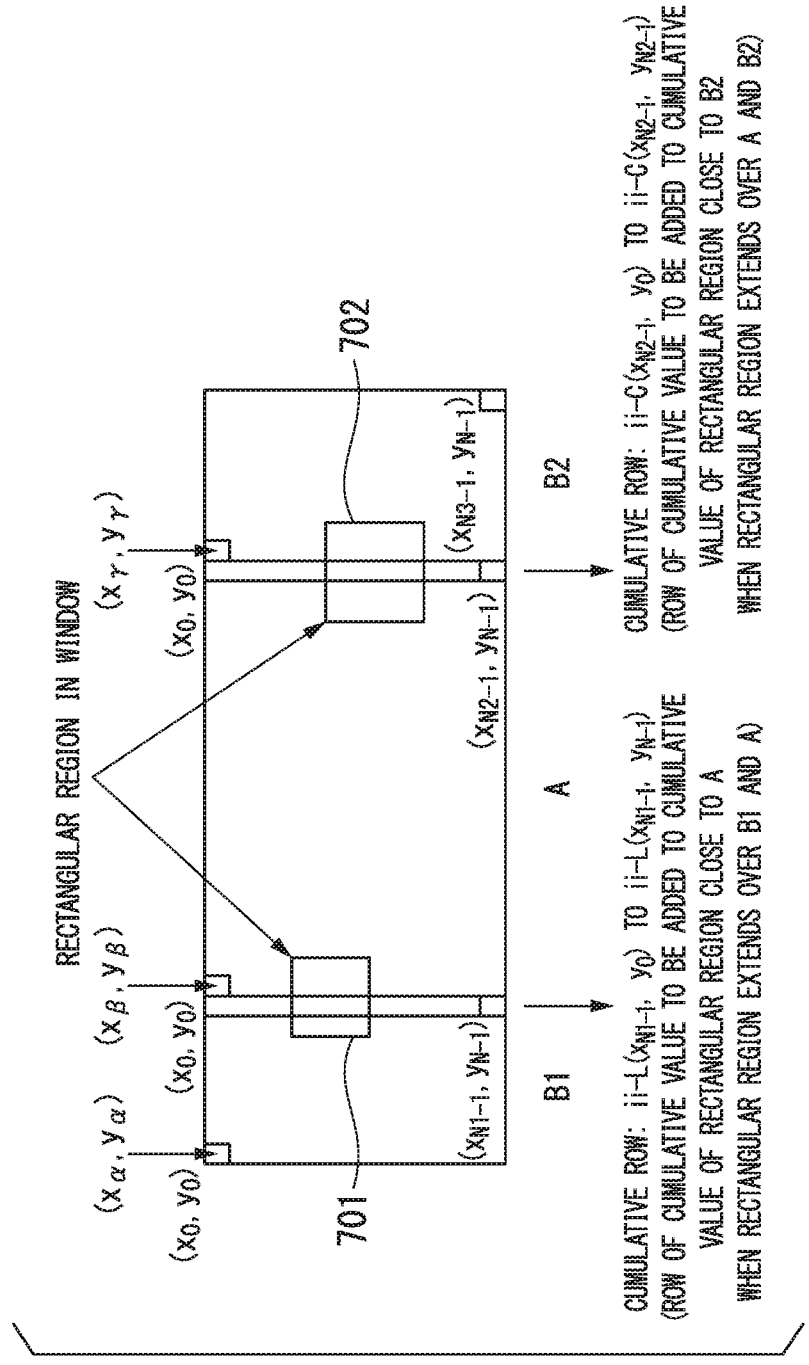
FIG. 14 is a diagram illustrating an example of column addition in integral histogram sub-regions.

FIG. 14 is a diagram illustrating an example of column addition in the integral histogram sub-regions.

Roughly, compared with the case where the integral histogram sub-regions in the vertical direction as shown in FIGS. 8 to 11 are used, this embodiment uses the integral histogram sub-regions in the horizontal direction as shown in FIG. 14. Accordingly, in this embodiment, the same calculation result can be obtained by inverting the rows and the columns in the vertical direction and applying the inversion result to the columns and rows.

A specific example shown in FIG. 14 will be described below.

$(x_0, y_0)$ represents the origin (pixel position) for calculating the cumulative value.

$(x_n, y_n)$ represents an arbitrary point (pixel position).

(N−1) is a value indicating the lowermost row in the object recognition regions (the left object recognition region, the front object recognition region, and the right object recognition region).

In $(x_{N1-1}, y_{N-1})$, (N1−1) is a value indicating the rightmost column in the left object recognition region.

In $(x_{N2-1}, y_{N-1})$, (N2−1) is a value indicating the rightmost column in the front object recognition region.

In $(x_{N3-1}, y_{N-1})$, (N3−1) is a value indicating the rightmost column in the right object recognition region.

In this embodiment, the left object recognition region has a rectangular shape, the left-top pixel position thereof is defined as $(x_\alpha, y_\alpha)$, and the right-bottom pixel position thereof is defined as $(x_{N1-1}, y_{N-1})$.

In the left object recognition region, the object recognition unit 13 adds the gradient magnitude values i(x, y) from $(x_0, y_0)=(x_\alpha, y_\alpha)$ to $(x_n, y_n)=(x_{N1-1}, y_{N-1})$ with the pixel position $(x_\alpha, y_\alpha)$ as a reference point and transmits the cumulative value ii−L$(x_n, y_n)$ to the memory 23.

In this embodiment, the front object recognition region has a rectangular shape, the left-top pixel position thereof is defined as $(x_\beta, y_\beta)$, and the right-bottom pixel position thereof is defined as $(x_{N2-1}, y_{N-1})$.

In the front object recognition region, the object recognition unit 13 adds the gradient magnitude values i(x, y) from $(x_0, y_0)=(x_\beta, y_\beta)$ to $(x_n, y_n)=(x_{N2-1}, y_{N-1})$ with the pixel position $(x_\beta, y_\beta)$ as a reference point and transmits the cumulative value ii−C$(x_n, y_n)$ to the memory 23.

In this embodiment, the right object recognition region has a rectangular shape, the left-top pixel position thereof is defined as $(x_\gamma, y_\gamma)$, and the right-bottom pixel position thereof is defined as $(x_{N3-1}, y_{N-1})$.

In the right object recognition region, the object recognition unit 13 adds the gradient magnitude values i(x, y) from $(x_0, y_0)=(x_\gamma, y_\gamma)$ to $(x_n, y_n)=(x_{N3-1}, y_{N-1})$ with the pixel position $(x_\gamma, y_\gamma)$ as a reference point and transmits the cumulative value ii−R$(x_n, y_n)$ to the memory 23.

A rectangular region 701 in a window extends over the left object recognition region and the front object recognition region.

In this case, in the rectangular region 701 in the window, the column of the cumulative value to be added to the cumulative value of the rectangular region close to the front recognition region is the rightmost column in the left object recognition region and the cumulative value thereof is ii−L$(x_{N1-1}, y_0)$ to ii−L$(x_{N1-1}, y_{N-1})$.

In the rectangular region 701 in the window, the rows of the cumulative value to be added to the cumulative value of the rectangular region close to the front object recognition region are the same row.

In this example, ii−L$(x_n, y_n)$ represents the cumulative value in the left object recognition region.

A rectangular region 702 in a window extends over the front object recognition region and the right object recognition region.

In this case, in the rectangular region 702 in the window, the column of the cumulative value to be added to the cumulative value of the rectangular region close to the right object recognition region is the rightmost column in the front object recognition region and the cumulative value thereof is ii−C$(x_{N2-1}, y_0)$ to ii−C$(x_{N2-1}, y_{N-1})$.

In the rectangular region 702 in the window, the rows of the cumulative value to be added to the cumulative value of the rectangular region close to the right object recognition region are the same row.

In this example, ii−C$(x_n, y_n)$ represents the cumulative value in the front object recognition region.

When such an object that a rectangular region in a window extends over three regions is recognized, the integrated value of the points of the rows corresponding to two columns (two columns of the left object recognition region and the front object recognition region) in total is added to the cumulative value of the rectangular region close to the right object recognition region.

Figure 15:
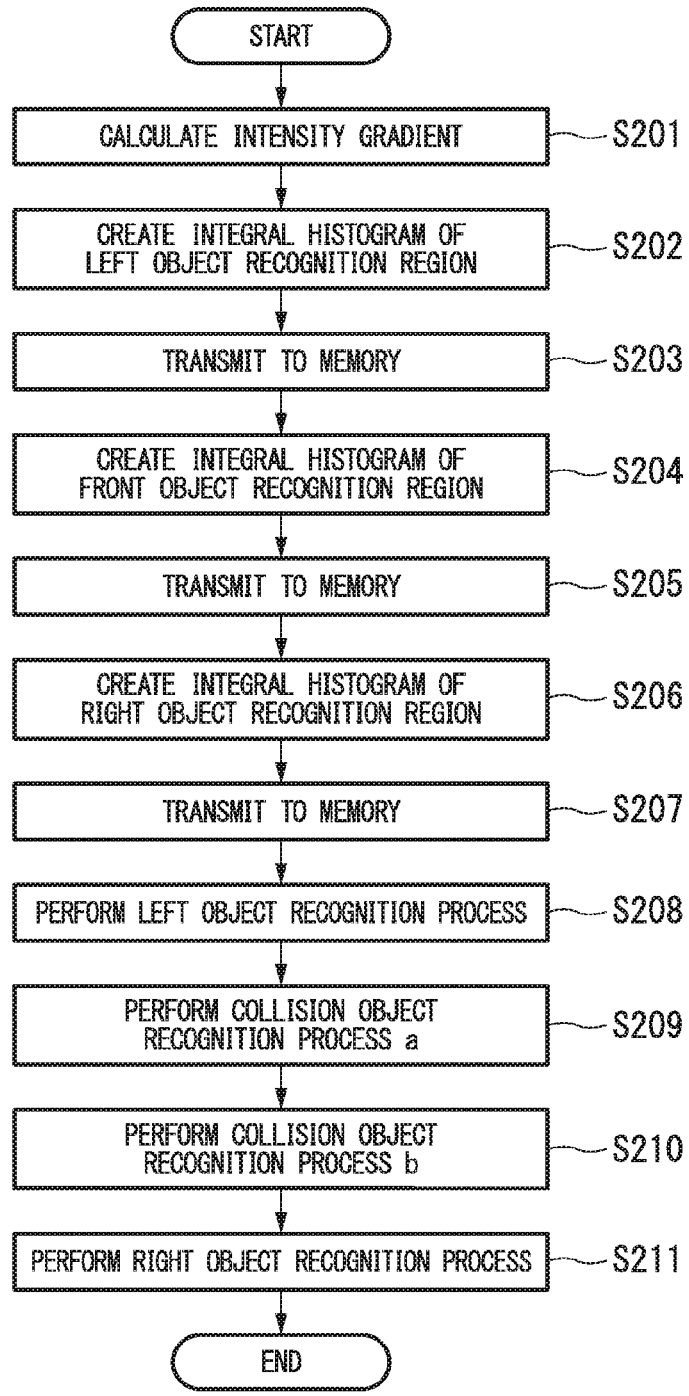
FIG. 15 is a flowchart illustrating an example of a process flow which is performed by an object recognition unit according to the third embodiment of the present invention.

FIG. 15 is a flowchart illustrating an example of a process flow which is performed by the object recognition unit 13 according to this embodiment.

Here, the flowchart shown in FIG. 15 is on the premise that an integral histogram is horizontally (longitudinally) divided into three sub-regions as shown in FIG. 13, additionally includes creation of sub integral histograms and transmission to the memory (steps S202 to S207) in comparison with the flowchart according to the background art shown in FIG. 20, and causes the additional steps to correspond to four types of object recognition (steps S208 to S211).

First, the object recognition unit 13 calculates a gradient of intensity in an image to be processed (from which a target object will be recognized in this embodiment) (step S201).

Then, the object recognition unit 13 creates an integral histogram of the left object recognition region (step S202).

The process of creating the integral histogram is performed, for example, by any one or more of the FPGA 21 (or the DSP) and the microcomputer 22.

Then, the object recognition unit 13 transmits data of the created integral histogram of the left object recognition region to the memory 23 (step S203).

Subsequently, the object recognition unit 13 creates an integral histogram of the front object recognition region (step S204).

Then, the object recognition unit 13 transmits the created integral histogram of the front object recognition region to the memory 23 (step S205).

Subsequently, the object recognition unit 13 creates an integral histogram of the right object recognition region (step S206).

Then, the object recognition unit 13 transmits the created integral histogram of the right object recognition region to the memory 23 (step S207).

Then, the object recognition unit 13 performs an object recognition process (a pattern recognition process for object recognition in this embodiment) with the data of the integral histogram stored in the memory 23 (steps S208 to S211).

Specifically, the object recognition unit 13 performs an left object recognition process (step S208), performs a collision object recognition process a (step S209), performs a collision object recognition process b (step S210), and performs a right object recognition process (step S211).

In the left object recognition process, a process of mainly recognizing an object present on the left side (for example, a region on the left side of the vehicle) of the image is performed.

In the collision object recognition process, a process of recognizing an object present in the front object recognition region (for example, a region having possibility of collision with the vehicle) of the image is performed.

In the collision object recognition process a and the collision object recognition process b, a process of recognizing different ground-contact objects is performed. Examples of the different ground-contact objects include a vehicle, a motorcycle, a bicycle, and a pedestrian.

In the right object recognition process, a process of recognizing an object present on the right side (for example, a region on the right side of the vehicle) of the image is performed.

For example, the same configuration or operation as described with reference to FIG. 6 (and FIG. 21) in the first embodiment can be used as details of the object recognition process.

In this embodiment, as described with reference to FIG. 14, in the process of step S27 in the flowchart shown in FIG. 6, the corresponding cumulative value adding processes are performed on the case where the rectangular region in the window extends over two sub-regions and the case where the rectangular region extends over three sub-regions, respectively, in association with three sub-regions (the left object recognition region, the front object recognition region, and the right object recognition region) divided in the horizontal direction.

As described above, when creating an integral histogram (or an integral image) of a specific region from an acquired image, the object recognition unit 13 of the camera ECU 1 in the image processing system according to this embodiment divides the horizontal region of the image into multiple sub-regions and calculates independent cumulative values thereof. When calculating the cumulative value of a rectangular range (rectangular region) extending over the horizontally-divided sub-regions, the object recognition unit 13 according to this embodiment calculates the cumulative value of a point in each right sub-region by adding the cumulative value in each left sub-regions of the point in the same row located in the rightmost column of each left sub-region (for example, each sub-region over which the rectangular range extends or all sub-regions present as another configuration example) to the cumulative value in the right sub-region of the point in the right sub-region.

When creating an integral histogram (or an integral image) of a specific region from an acquired image, the object recognition unit 13 according to this embodiment divides the horizontal region of the image into multiple sub-regions and calculates the independent cumulative values thereof. Then, the object recognition unit 13 according to this embodiment uses the cumulative values in the sub-regions (divided regions) when calculating the cumulative value of the rectangular range (rectangular region) not extending over the horizontally-divided sub-regions.

The object recognition unit 13 according to this embodiment calculates the cumulative value with respect to the position of a reference point common to the sub-regions as the independent cumulative value in each sub-region.

As described above, by employing the object recognition unit 13 of the camera ECU 1 in the image processing system according to this embodiment, it is possible to efficiently acquire a cumulative value of a predetermined range (region).

That is, in the object recognition unit 13 according to this embodiment, it is possible to limit the data length using a cumulative value (for example, which may be an addition frequency for each gradient direction in addition to a cumulative value of a gradient magnitude for each gradient direction) without losing the volume of information by dividing the region of an integral histogram (or an integral image) and to simply calculate a cumulative value of a rectangular region to calculate a feature value.

For example, in this embodiment, by using the cumulative value limiting the data length, it is possible to realize small capacity of the memory 23 and to improve efficiency of transmission of data to the memory 23 or access of a CPU to the memory, thereby efficiently calculating a feature value. In this embodiment, in an integration method of using a common integral histogram (or an integral image) as data of pattern recognition of each target object, processes of recognizing multiple types of target object at a time, such as a road traffic sign, in addition to a vehicle, a motorcycle, a bicycle, and a pedestrian can be performed by a single device (for example, the camera ECU 1 according to this embodiment).

According to this embodiment, a device and a method suitable for recognizing a target object and a computer program used for the device or method can be provided.

CONFIGURATION EXAMPLES OF ABOVE-MENTIONED EMBODIMENTS

General Configuration Example

An image processing device (the camera ECU 1 in the above-mentioned embodiments) includes: an image acquiring unit 12 configured to acquire an image; a storage unit (the memory 23 in the above-mentioned embodiments) configured to store information on a cumulative value of a value associated with a predetermined pixel for each sub-region, which is obtained by dividing an image region into a plurality of sub-regions, in the image acquired by the image acquiring unit 12; and an image processing unit (the object recognition unit 13 in the above-mentioned embodiments) configured to acquire a cumulative value of a value associated with a pixel of the image acquired by the image acquiring unit 12 in a rectangular range set in the image region based on the information stored in the storage unit.

The above-mentioned embodiments describe a configuration example where the storage unit (the memory 23 in the above-mentioned embodiments) is included in the image processing unit (the object recognition unit 13 in the above-mentioned embodiments). In another configuration example, the storage unit may be provided independently of the image processing unit.

Various numbers may be used as the number of sub-regions into which the image region is divided.

Various sub-regions may be used as the sub-region.

Various rectangular ranges may be used as the rectangular range set in the image region.

The cumulative value of the value associated with a pixel in the image in the rectangular range set in the image region can be used, for example, as a feature value of the rectangular range (an image portion of the rectangular range) in the image.

Configuration Example 1

In the image processing device, the image region is divided into a plurality of sub-regions in the vertical direction. When the rectangular range set in the image region extends over two or more sub-regions, the image processing unit acquires the cumulative value at a pixel position in the lowermost sub-region of the two or more sub-regions by adding the cumulative values in the upper sub-regions at the pixel position in the same column of a lowermost row in the upper sub-regions, over which the rectangular range extends, to the cumulative value in the lowermost sub-region at the pixel position in the lowermost sub-region.

In this case, the image processing unit uses, for example, the cumulative value in another sub-region (a sub-region other than the lowermost sub-region) at a pixel position stored in the storage unit as the cumulative value at the pixel position in the corresponding sub-region.

The image processing unit acquires the cumulative value of the value associated with the pixel in the image acquired by the image acquiring unit in the rectangular range, for example, using the information on the cumulative values at the pixel positions of four vertices of the rectangular range set in the image region.

Configuration Example 2

In the image processing device, the image region is divided into a plurality of sub-regions in the horizontal direction. When the rectangular range set in the image region extends over two or more sub-regions, the image processing unit acquires the cumulative value at a pixel position in the rightmost sub-region of the two or more sub-regions by adding the cumulative values in the left sub-regions at the pixel position in the same row of a rightmost column in the left sub-regions, over which the rectangular range extends, to the cumulative value in the rightmost sub-region at the pixel position in the rightmost sub-region.

In this case, the image processing unit uses, for example, the cumulative value in another sub-region (a sub-region other than the rightmost sub-region) at a pixel position stored in the storage unit as the cumulative value at the pixel position in the corresponding sub-region.

The image processing unit acquires the cumulative value of the value associated with the pixel in the image acquired by the image acquiring unit in the rectangular range, for example, using the information on the cumulative values at the pixel positions of four vertices of the rectangular range set in the image region.

Configuration Example 3

In the image processing device, when the rectangular range set in the image region is received in one sub-region, the image processing unit acquires the cumulative value of a value associated with a pixel in the image acquired by the image acquiring unit with the rectangular range using information of the cumulative value in the corresponding region at pixel positions of four vertices of the rectangular range stored in the storage unit.

Configuration Example 4

In the image processing device, the storage unit stores information on cumulative values of pixels, which are included in a range of a rectangular portion having a predetermined reference pixel position and each pixel position as diagonal vertices, as the information on the cumulative value at each pixel position for each sub-region, which is obtained by dividing the image region into a plurality of sub-regions, in the image acquired by the image acquiring unit 12.

For example, the left-top pixel position of each sub-region can be used as the predetermined reference pixel position.

Configuration Example 5

In the image processing device, the intensity value of a pixel is used as the value associated with the pixel, and an integral image is used as an integrated value of the value associated with the pixel.

(Configuration Example 6

In the image processing device, a gradient value of a pixel for each gradient direction is used as the value associated with the pixel, and an integral histogram for each gradient direction is used as an integrated value of the value associated with the pixel.

Summary of Above-Mentioned Embodiments

The above-mentioned embodiments (the first embodiment to the third embodiment) describe the combination of the two-division or three-division integral histogram method and the added data length reduction, but the number of sub-regions in the image region may be increased to improve an added data length reduction rate (a rate of data reduction).

The above-mentioned embodiments (the first embodiment to the third embodiment) describes in-vehicle target object recognition as an example, but the invention may be applied to, for example, specific object recognition or general object recognition for other applications in which a cumulative value such as an integral histogram (or an integral image) is calculated. The invention is not limited to object recognition using an image, but may be applied to any image process.

In the above-mentioned embodiments (the first embodiment to the third embodiment), the vertical (transverse) division method and the horizontal (longitudinal) division method are described as the method of dividing an image region into multiple sub-regions (multiple integral histogram sub-regions in the above-mentioned embodiments). On the other hand, in order to simply calculate cumulative values in the region of the entire integral histogram (or the entire integral image) from the sub integral histogram (or integral image) regions, it is thought that an image region is preferably not divided in both the vertical direction and the horizontal direction.

By employing any one of the vertical and horizontal directions, it is though that the cumulative values can be simply calculated even when the number of sub-regions is large.

In order to divide an image region of which the integral histogram (or the integral image) is created, a configuration in which an image region is divided into both the vertical and horizontal directions may be employed.

Any method may be used as the method of creating the integral histogram (or the integral image).

The above-mentioned embodiments (the first embodiment to the third embodiment) describe a case using the integral histogram (or the integral image), but any integrated value (cumulative value) which is an integration (addition) result of any value of an image may be used instead. Regarding such integrated value (cumulative value), by dividing the entire image region into multiple sub-regions and calculating the integrated value (cumulative value) for each sub-region, the respective integrated values (cumulative values) can be reduced and thus the data capacity required for the memory can be reduced.

Programs for realizing the functions of the processes that are performed by any of the constructive units (for example, the object recognition unit 13) in the image processing system according to the embodiment shown in FIG. 1 may be recorded on a computer-readable recording medium and the programs recorded on the recording medium may be read and executed by a computer system to perform the processes. The "computer system" includes an OS (Operating System) and hardware such as peripherals. The "computer system" also includes a WWW system having a homepage provision environment (or display environment). The "computer-readable recording medium" includes a portable medium such as a flexible disc, a magneto-optical disc, a ROM, or a CD-ROM or a storage device such as a hard disk built in the computer system. The "computer-readable recording medium" also includes a device storing a program for a predetermined time, like an internal volatile memory (RAM (Random Access Memory)) of a computer system serving as a server or a client when the programs are transmitted through a network such as the Internet or a communication line such as a telephone line.

The above programs may be transmitted from a computer system having the programs stored in a storage device thereof or the like to another computer system through a transmission medium or by carrier waves in the transmission medium. The "transmission medium" which transmits a program means a medium having a function of transmitting information and examples thereof include a network (communication network) such as the Internet and a communication link (communication line) such as a telephone line. The program may realize some of the above-described functions. The program may realize the above-described functions in combination with a program already recorded in a computer system, that is, the program may be a differential file (differential program).

In addition, not being limited to the above description, it is possible to realize the processes that are performed by any of the constructive units in the image processing system according to the embodiment shown in FIG. 1 by using devices such as an FPGA, a DSP, or the like other than a micro-computer.

While the embodiments of the invention have been described with reference to the accompanying drawings, the specific constitutions are not limited to the embodiments, and may include other designs which do not depart from the concept of the invention.

What is claimed is:

1. An image processing device comprising:
an image acquiring unit configured to acquire an image;
a storage unit configured to store information on a cumulative value of a value associated with a predetermined pixel for each sub-region, which is obtained by dividing an image region into a plurality of sub-regions, in the image acquired by the image acquiring unit; and
an image processing unit configured to acquire a cumulative value of a value associated with a pixel of the image acquired by the image acquiring unit in a rectangular range set in the image region based on the information stored in the storage unit,
wherein the image region is divided into a plurality of sub-regions in the vertical direction, and
wherein when the rectangular range set in the image region extends over two or more sub-regions, the image processing unit acquires the cumulative value at a pixel position in the lowermost sub-region of the two or more sub-regions by adding the cumulative values in the upper sub-regions at the pixel position in the same column of a lowermost row in the upper sub-regions, over which the rectangular range extends, to the cumulative value in the lowermost sub-region at the pixel position in the lowermost sub-region.

2. The image processing device according to claim 1,
wherein when the rectangular range set in the image region is received in one sub-region, the image processing unit acquires the cumulative value of a value associated with a pixel in the image acquired by the image acquiring unit with the rectangular range using information of the cumulative value in the corresponding region at pixel positions of four vertices of the rectangular range stored in the storage unit.

3. The image processing device according to claim 1,
wherein the storage unit stores information on cumulative values of pixels, which are included in a range of a rectangular portion having a predetermined reference pixel position and each pixel position as diagonal vertices, as the information on the cumulative value at each pixel position for each sub-region, which is obtained by dividing the image region into a plurality of sub-regions, in the image acquired by the image acquiring unit.

4. The image processing device according to claim 1,
wherein an intensity value of a pixel is used as the value associated with the pixel, and
wherein an integral image is used as an integrated value of the value associated with the pixel.

5. The image processing device according to claim 1,
wherein a gradient value of a pixel for each gradient direction is used as the value associated with the pixel, and
wherein an integral histogram for each gradient direction is used as an integrated value of the value associated with the pixel.

6. An image processing device comprising:
an image acquiring unit configured to acquire an image;

a storage unit configured to store information on a cumulative value of a value associated with a predetermined pixel for each sub-region, which is obtained by dividing an image region into a plurality of sub-regions, in the image acquired by the image acquiring unit; and an image processing unit configured to acquire a cumulative value of a value associated with a pixel of the image acquired by the image acquiring unit in a rectangular range set in the image region based on the information stored in the storage unit, wherein the image region is divided into a plurality of sub-regions in the horizontal direction, and wherein when the rectangular range set in the image region extends over two or more sub-regions, the image processing unit acquires the cumulative value at a pixel position in the rightmost sub-region of the two or more sub-regions by adding the cumulative values in the left sub-regions at the pixel position in the same row of a rightmost column in the left sub-regions, over which the rectangular range extends, to the cumulative value in the rightmost sub-region at the pixel position in the rightmost sub-region.

7. The image processing device according to claim 6, wherein when the rectangular range set in the image region is received in one sub-region, the image processing unit acquires the cumulative value of a value associated with a pixel in the image acquired by the image acquiring unit with the rectangular range using information of the cumulative value in the corresponding region at pixel positions of four vertices of the rectangular range stored in the storage unit.

8. The image processing device according to claim 6, wherein the storage unit stores information on cumulative values of pixels, which are included in a range of a rectangular portion having a predetermined reference pixel position and each pixel position as diagonal vertices, as the information on the cumulative value at each pixel position for each sub-region, which is obtained by dividing the image region into a plurality of sub-regions, in the image acquired by the image acquiring unit.

9. The image processing device according to claim 6, wherein an intensity value of a pixel is used as the value associated with the pixel, and wherein an integral image is used as an integrated value of the value associated with the pixel.

10. The image processing device according to claim 6, wherein a gradient value of a pixel for each gradient direction is used as the value associated with the pixel, and wherein an integral histogram for each gradient direction is used as an integrated value of the value associated with the pixel.

11. An image processing method comprising:

causing an image acquiring unit to acquire an image; and causing an image processing unit to acquire a cumulative value of a value associated with a pixel of the image acquired by the image acquiring unit in a rectangular range set in an image region based on information stored in a storage unit, which is configured to store information on a cumulative value of a value associated with a predetermined pixel for each sub-region, which is obtained by dividing an image region into a plurality of sub-regions in the vertical direction, in the image acquired by the image acquiring unit, and to acquire the cumulative value at a pixel position in the lowermost sub-region of two or more sub-regions by adding the cumulative values in the upper sub-regions at the pixel position in the same column of a lowermost row in the upper sub-regions, over which the rectangular range extends, to the cumulative value in the lowermost sub-region at the pixel position in the lowermost sub-region when the rectangular range set in the image region extends over the two or more sub-regions.

12. An image processing method comprising:

causing an image acquiring unit to acquire an image; and causing an image processing unit to acquire a cumulative value of a value associated with a pixel of the image acquired by the image acquiring unit in a rectangular range set in an image region based on information stored in a storage unit, which is configured to store information on a cumulative value of a value associated with a predetermined pixel for each sub-region, which is obtained by dividing an image region into a plurality of sub-regions in the horizontal direction, in the image acquired by the image acquiring unit, and to acquire the cumulative value at a pixel position in the rightmost sub-region of two or more sub-regions by adding the cumulative values in the left sub-regions at the pixel position in the same row of a rightmost column in the left sub-regions, over which the rectangular range extends, to the cumulative value in the rightmost sub-region at the pixel position in the rightmost sub-region when the rectangular range set in the image region extends over the two or more sub-regions.

13. An image processing program stored on a non-transitory computer-readable medium for causing a computer to perform: a sequence of causing an image acquiring unit to acquire an image; and a sequence of causing an image processing unit to acquire a cumulative value of a value associated with a pixel of the image acquired by the image acquiring unit in a rectangular range set in an image region based on information stored in a storage unit, which is configured to store information on a cumulative value of a value associated with a predetermined pixel for each sub-region, which is obtained by dividing an image region into a plurality of sub-regions in the vertical direction, in the image acquired by the image acquiring unit, and to acquire the cumulative value at a pixel position in the lowermost sub-region of two or more sub-regions by adding the cumulative values in the upper sub-regions at the pixel position in the same column of a lowermost row in the upper sub-regions, over which the rectangular range extends, to the cumulative value in the lowermost sub-region at the pixel position in the lowermost sub-region when the rectangular range set in the image region extends over the two or more sub-regions.

14. An image processing method program stored on a non-transitory computer-readable medium for causing a computer to perform: a sequence of causing an image acquiring unit to acquire an image; and a sequence of causing an image processing unit to acquire a cumulative value of a value associated with a pixel of the image acquired by the image acquiring unit in a rectangular range set in an image region based on information stored in a storage unit, which is configured to store information on a cumulative value of a value associated with a predetermined pixel for each sub-region, which is obtained by dividing an image region into a plurality of sub-regions in the horizontal direction, in the image acquired by the image acquiring unit, and to acquire the cumulative value at a pixel position in the rightmost sub-region of two or more sub-regions by adding the cumulative values in the left sub-regions at the pixel position in the same row of a rightmost column in the left sub-regions, over which the rectangular range extends, to the cumulative value in the rightmost sub-region at the pixel position in the rightmost sub-region when the rectangular range set in the image region extends over the two or more sub-regions.

* * * * *